US012743622B2

(12) United States Patent
Ortner et al.

(10) Patent No.: US 12,743,622 B2
(45) Date of Patent: Sep. 22, 2026

(54) NEURONAL ACTIVITY MODULATION OF ARTIFICIAL NEURAL NETWORKS

(71) Applicant: International Business Machines Corporation, Armonk, NY (US)

(72) Inventors: Thomas Ortner, Zurich (CH); Ayush Garg, Delhi (IN); Stanislaw Andrzej Wozniak, Kilchberg (CH); George Andrei Saon, Stamford, CT (US); Angeliki Pantazi, Thalwil (CH)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 622 days.

(21) Appl. No.: 18/342,002

(22) Filed: Jun. 27, 2023

(65) Prior Publication Data

US 2025/0005348 A1 Jan. 2, 2025

(51) Int. Cl.
*G06N 3/08* (2023.01)

(52) U.S. Cl.
CPC .................................... *G06N 3/08* (2013.01)

(58) Field of Classification Search
CPC .......... G06N 3/08; G06N 3/044; G06N 3/049; G06N 3/063
See application file for complete search history.

(56) References Cited

U.S. PATENT DOCUMENTS 11,868,878 B1 * 1/2024 Huang .................. G06N 3/084
2014/0279771 A1 9/2014 Golovashkin et al.
2020/0311962 A1 * 10/2020 Yang ...................... G06N 3/084
2020/0401876 A1 12/2020 Chakrabartty et al.
2022/0198245 A1 * 6/2022 Cleland ................ G06N 3/0495
(Continued)

FOREIGN PATENT DOCUMENTS

CN 115130651 A 9/2022
EP 3502973 A1 6/2019

OTHER PUBLICATIONS

Abdelhack, M. et al. | "A Modulation Layer to Increase Neural Network Robustness Against Data Quality Issues." arXiv:2107.08574v4 [cs.LG] Apr. 22, 2023, 21 pages.
(Continued)

*Primary Examiner* — Oluwatosin Alabi
(74) *Attorney, Agent, or Firm* — Amin, Turocy & Watson, LLP

(57) ABSTRACT

Systems and techniques that facilitate neuronal activity modulation of artificial neural networks are provided. In various embodiments, an artificial neural network can comprise a set of base neuron populations that collectively generate, during an inferencing phase or a training phase of the artificial neural network, an inferencing task result based on a data candidate. In various aspects, the artificial neural network can comprise a control neuron population that is independent of the set of base neuron populations. In various instances, the control neuron population can modulate, during the inferencing phase or the training phase, neuronal activity of at least one base neuron population of the set of base neuron populations. In various cases, the control neuron population can modulate the neuronal activity of the at least one base neuron population by scaling one or more operands internally produced by the at least one base neuron population.

20 Claims, 15 Drawing Sheets

(56) References Cited

U.S. PATENT DOCUMENTS

2022/0269879 A1* 8/2022 Liu ...................... G06V 40/171
2024/0169213 A1* 5/2024 Letunovskiy .......... G06N 3/045

OTHER PUBLICATIONS

Hembrook-Short, J.R. et al. | "Attentional Modulation of Neuronal Activity Depends on Neuronal Feature Selectivity." Current Biology 27, 1878-1887, Jul. 10, 2017, http://dx.doi.org/10.1016/j.cub.2017.05.080, 16 pages.
Naumann, L. B. et al. | "Invariant neural subspaces maintained by feedback modulation." eLife, 2022; 11:e76096. DOI: https://doi.org/10.7554/eLife.76096, Preprinted: Nov. 1, 2021, 27 pages.
Aitken, K. et al. | "Neural population dynamics of computing with synaptic modulations." eLife 2023;12:e83035. DOI: https://doi.org/10.7554/eLife.83035, Preprinted: Jun. 30, 2022, 39 pages.
Liu, F. et al. | "Enhancing spiking neural networks with hybrid top-down attention." Frontiers in Neuroscience, DOI 10.3389/fnins.2022.949142, Published Aug. 22, 2022, 14 pages.
Wagatsuma, N. et al. | "Layer-dependent attentional processing by top-down signals in a visual cortical microcircuit model." Frontiers in Computational Neuroscience, doi: 10.3389/fncom.2011.00031, published: Jul. 8, 2011, 15 pages.
Masse, N. Y. et al. | "Alleviating catastrophic forgetting using contextdependent gating and synaptic stabilization." Published online Oct. 12, 2018, downloaded from https://www.pnas.org on Aug. 3, 2022, 9 pages.
Lin, D. et al. | "ZigZagNet: Fusing Top-Down and Bottom-Up Context for Object Segmentation." Open Access version of 2019 IEEE/CVF Conference on Computer Vision and Pattern Recognition (CVPR), Long Beach, CA, USA, 2019, pp. 7482-7491, doi: 10.1109/CVPR.2019.00767, 10 pages.
Rao, R. P.N et al. | "Predictive coding in the visual cortex: a functional interpretation of some extra-classical receptive-field effects. " http://neurosci.nature.com, Nature Neuroscience, vol. 2, No. 1, Jan. 1999, 9 pages.
Friston, K. | "A theory of cortical responses." Phil. Trans. R. Soc. B (2005) 360, 815-836, doi:10.1098rstb.2005.1622, published online Apr. 29, 2005, 22 pages.
Manita, S. et al. | "A Top-Down Cortical Circuit for Accurate Sensory Perception." Neuron 86, 1304-1316 Jun. 3, 2015, http://dx.doi.org/10.1016/j.neuron.2015.05.006, 14 pages.
Grossberg, St. et al. | "A Canonical Laminar Neocortical Circuit Whose Bottom-Up, Horizontal, and Top-Down Pathways Control Attention, Learning, and Prediction." Frontiers in Systems Neuroscience, published: Apr. 23, 2021 doi: 10.3389/fnsys.2021.650263, 21 pages.
He, K. et al. | "Deep Residual Learning for Image Recognition." arXiv:1512.03385v1 [cs.CV] Dec. 10, 2015, 12 pages.
Bohnstingl, T. (now Ortner, T.) et al. | "Speech Recognition Using Biologically-Inspired Neural Networks," ICASSP 2022-2022 IEEE International Conference on Acoustics, Speech and Signal Processing (ICASSP), Singapore, Singapore, 2022, pp. 6992-6996, doi: 10.1109/ICASSP43922.2022.9747499, 5 pages.
Klausberger, Th. et al. | "Neuronal Diversity and Temporal Dynamics: The Unity of Hippocampal Circuit Operations." www.sciencemag.org Science vol. 321, Jul. 4, 2008, 6 pages.
Teeter, C. et al. | "Generalized leaky integrate-and-fire models classify multiple neuron types." Nature Communications, (2018) 9:709, DOI: 10.1038/s41467-017-02717-4, 15 pages.
Zheng, Y. et al. | "Fusing Bottom-up and Top-down Pathways in Neural Networks for Visual Object Recognition." The 2010 International Joint Conference on Neural Networks (IJCNN), Barcelona, Spain, 2010, pp. 1-8, doi: 10.1109/ IJCNN.2010.5596497, 8 pages.
Mittal, S. et al. | "Learning to Combine Top-Down and Bottom-Up Signals in Recurrent Neural Networks with Attention over Modules." arXiv:2006.16981v3 [cs.LG] Nov. 15, 2020, 15 pages.
Bohnstingl, T. (now Ortner, T.) et al. | "Towards efficient end-to-end speech recognition with biologically-inspired neural networks." 35th Conference on Neural Information Processing Systems (NeurIPS 2021), 8 pages.
Wozniak, St. et al. | "Deep learning incorporating biologically-inspired neural dynamics." arXiv:1812.07040, published Jun. 15, 2020, 12 pages.
Vaswani, A. et al. | "Attention Is All You Need." 31st Conference on Neural Information Processing Systems (NIPS 2017), Long Beach, CA, USA, 11 pages.
Millidge, B. et al. | "A Theoretical Framework for Inference and Learning in Predictive Coding Networks." arXiv:2207.12316v2 [cs.NE] Aug. 3, 2022, 32 pages.
No Author, "The cost of training machines is becoming a problem", https://web.archive.org/web/20231004000241/ https://www.economist.com/technology-quarterly/2020/06/11/the-cost-of-training-machines-is-becoming-a-problem, Oct. 4, 2023, 8 pages.
Graves, Alex, "Sequence Transduction with Recurrent Neural Networks", Computer Science, Nov. 14, 2012, 9 pages.
Chan et al., "Listen, Attend and Spell: A Neural Network for Large Vocabulary Conversational Speech Recognition", IEEE, International Conference on Acoustics, Speech, and Signal Processing, 2016, 5 pages.
Gulati et al., "Conformer: Convolution-augmented Transformer for Speech Recognition", Computer Science, May 16, 2020, 5 pages.
He et al., "Streaming End-to-end Speech Recognition for Mobile Devices", IEEE, International Conference on Acoustics, Speech, and Signal Processing, 2019, pp. 6381-6385.
Gondi et al., "Performance and Efficiency Evaluation of ASR Inference on the Edge", Sustainability, vol. 13, No. 12392, Nov. 10, 2021, 15 pages.
Douglas et al., "Recurrent Neuronal Circuits in the Neocortex", Current Biology, Jul. 3, 2007; 17(13):R496-500, doi: 10.1016/j.cub.2007.04.024, 5 pages.
Sporns et al., "The Human Connectome: A Structural Description of the Human Brain", PLOS Computational Biology, vol. 1, No. 4, e42, Sep. 2005, 7 pages.
Rubinov et al., "Complex Network Measures of Brain Connectivity: Uses and Interpretations", NeuroImage, vol. 52, 2010, 11 pages.
Potjans et al., "The Cell-Type Specific Cortical Microcircuit: Relating Structure and Activity in a Full-Scale Spiking Network Model", Cerebral Cortex, vol. 24, No. 3, Mar. 2014, 22 pages.
Sporns, Olaf, "Networks of the Brain", Massachusetts Institute of Technology Press, 2011, 433 pages.
Bugeon et al., "A Transcriptomic Axis Predicts State Modulation of Cortical Interneurons", Nature, vol. 607, Jul. 14, 2022, 35 pages.
Condylis et al., "Dense Functional and Molecular Readout of a Circuit Hub in Sensory Cortex", Science, vol. 375, No. 6576, Jan. 7, 2022, 23 pages.
Mott et al., "Interneuron Diversity Series: Interneuron Research-Challenges and Strategies", Trends in Neurosciences, vol. 26, No. 9, Sep. 2003, 484-488, 5 pages.
Harris et al., "The Neocortical Circuit: Themes and Variations", Nature Neuroscience, vol. 18, No. 2, Feb. 2015, 30 pages.
Pelkey et al., "Hippocampal Gabaergic Inhibitory Interneurons", Physiological Reviews, vol. 97, Sep. 27, 2017, 1619-1747, 129 pages.
Woznaik et al., "Deep Learning Incorporating Biologically-inspired Neural Dynamics and in-memory Computing", Nature Machine Intelligence, vol. 2, Jun. 2020, 19 pages.
Stockl et al., "Structure Induces Computational Function in Networks with Diverse Types of Spiking Neurons", Biology, Jul. 6, 2022, 34 pages.
Bohnstingl et al., "Speech Recognition Using Biologically-inspired Neural Networks", ICASSP 2022-2022 IEEE International Conference on Acoustics, Speech and Signal Processing (ICASSP), Singapore, Singapore, 2022, pp. 6992-6996, doi: 10.1109/ICASSP43922.2022.9747499, 5 pages.
Liguz-Lecznar et al., "Somatostatin and Somatostatin-Containing Neurons in Shaping Neuronal Activity and Plasticity", Frontiers in Neural Circuits, Jun. 30, 2016, 15 pages.

(56) References Cited

OTHER PUBLICATIONS

Ferguson et al., "Mechanisms Underlying Gain Modulation in the Cortex", Nature Reviews Neuroscience, vol. 21, No. 2, Feb. 2020, 50 pages.
Soan et al., "Advancing RNN Transducer Technology for Speech Recognition", ICASSP 2021-2021 IEEE International Conference on Acoustics, Speech and Signal Processing (ICASSP), Toronto, ON, Canada, 2021, pp. 5654-5658, doi: 10.1109/ICASSP39728.2021.9414716, 5 pages.
Allen Institute for Brain Science | "Allen Human Brain Atlas", on-line tool http://atlas.brain-map.org/, published 2010, last accessed Sep. 13, 2023, 14 pages.
McBain et al., "Interneurons Unbound", Nature Reviews, Neuroscience, vol. 2, Jan. 2001, 13 pages.
Bellec et al., "Long Short-term Memory and Learning-to-learn In Networks of Spiking Neurons", 32nd Conference on Neural Information Processing Systems (NeurIPS 2018), Montreal, Canada, 11 pages.

* cited by examiner

200

CONTROL NEURON POPULATION 110

OPERAND 208($P_{CONTROL}$)

OPERAND 208(1)

208

CONTROL NEURONAL DYNAMICS 206

INPUT VECTORS 204

OUTPUT VECTOR 210

OUTPUT-SIDE NEURONAL ACTIVITY MODULATION

BASE NEURON POPULATION 108($J$)

MODULATORY NEURONAL DYNAMICS 218

OPERAND 214($P_J$)

OPERAND 214(1)

214

BASE NEURONAL DYNAMICS 212

OUTPUT VECTOR 216

INPUT VECTORS 202

300

CONTROL NEURON POPULATION 110

OPERAND 208($P_{CONTROL}$)

OPERAND 208(1)

208

OUTPUT VECTOR 210

CONTROL NEURONAL DYNAMICS 206

INPUT VECTORS 204

INPUT-SIDE NEURONAL ACTIVITY MODULATION

BASE NEURON POPULATION 108(*J*)

MODULATORY NEURONAL DYNAMICS 218

OPERAND 214($P_J$)

OPERAND 214(1)

214

OUTPUT VECTOR 216

BASE NEURONAL DYNAMICS 212

INPUT VECTORS 202

400

CONTROL NEURON POPULATION 110

OPERAND 208($P_{CONTROL}$)

OPERAND 208(1)

208

OUTPUT VECTOR 210

CONTROL NEURONAL DYNAMICS 206

INPUT VECTORS 204

INTERMEDIATE-SIDE NEURONAL ACTIVITY MODULATION

BASE NEURON POPULATION 108($J$)

MODULATORY NEURONAL DYNAMICS 218

OPERAND 214($P_J$)

OPERAND 214(1)

214

OUTPUT VECTOR 216

BASE NEURONAL DYNAMICS 212

INPUT VECTORS 202

PERCEPTRON DYNAMICS WITH INTERMEDIATE-SIDE NEURONAL ACTIVITY MODULATION

1400

GENERATING, BY A SET OF BASE NEURON POPULATIONS OF AN ARTIFICIAL NEURAL NETWORK AND DURING AN INFERENCING PHASE OR A TRAINING PHASE OF THE ARTIFICIAL NEURAL NETWORK, AN INFERENCING TASK RESULT BASED ON A DATA CANDIDATE

1402

MODULATING, BY A CONTROL NEURON POPULATION THAT IS INDEPENDENT OF THE SET OF BASE NEURON POPULATIONS AND DURING THE INFERENCING PHASE OR THE TRAINING PHASE, NEURONAL ACTIVITY OF AT LEAST ONE BASE NEURON POPULATION OF THE SET OF BASE NEURON POPULATIONS

1404

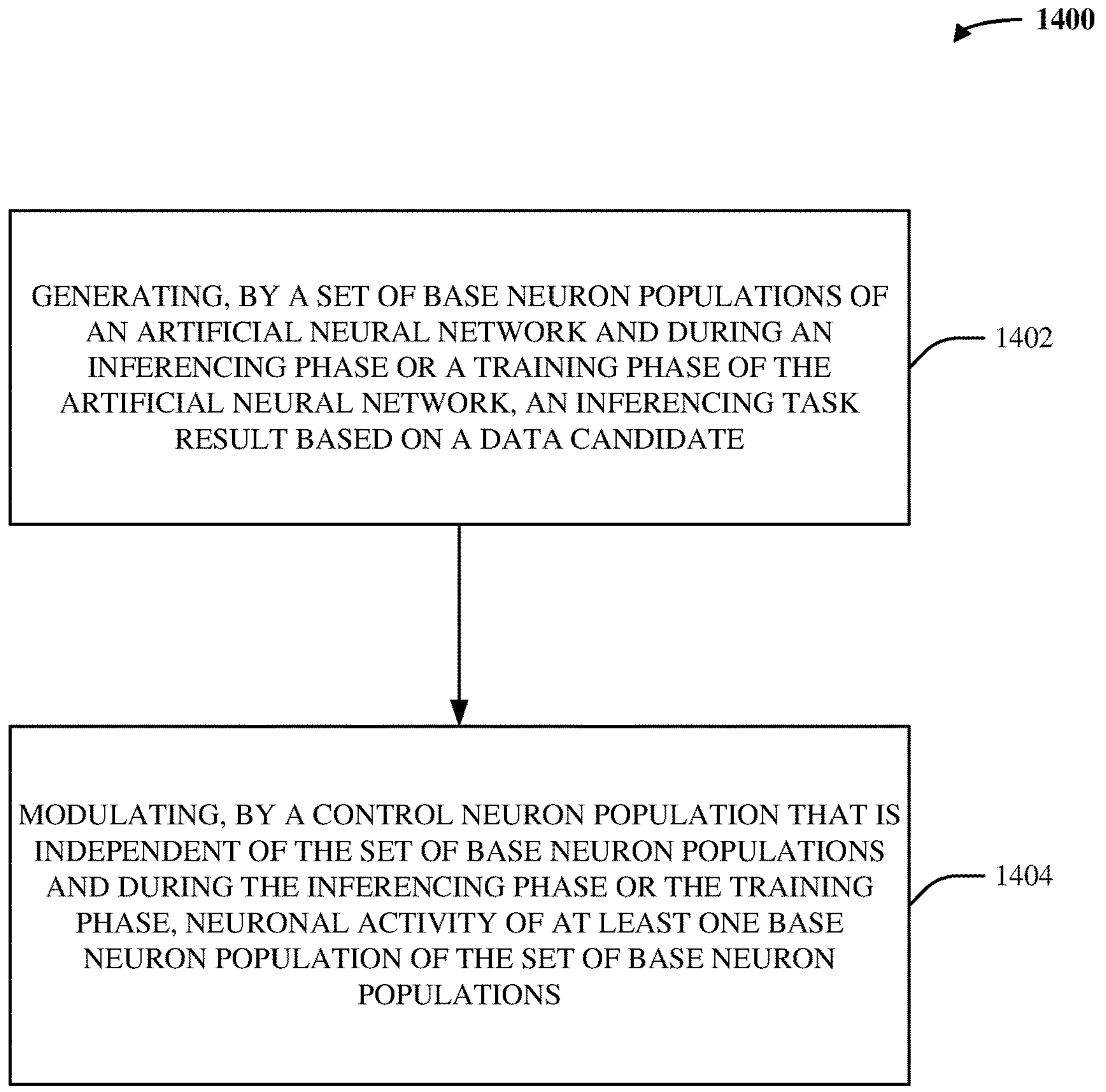

FIG. 14

NEURONAL ACTIVITY MODULATION OF ARTIFICIAL NEURAL NETWORKS

BACKGROUND

An artificial neural network can be trained to perform an inferencing task. Often, attempts to increase the inferencing accuracy of the artificial neural network include commensurately increasing its computational footprint. Conversely, attempts to decrease the computational footprint of the artificial neural network often cause commensurate reduction of its inferencing accuracy.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, devices, systems, methods, or apparatuses that can facilitate neuronal activity modulation of artificial neural networks are described.

According to one or more embodiments, a system is provided. In various aspects, the system comprises a processor and a computer-readable memory. In various instances, an artificial neural network is stored on the computer-readable memory and is executable by the processor. In various cases, the artificial neural network can comprise a set of base neuron populations that can collectively generate, during an inferencing phase or a training phase of the artificial neural network, an inferencing task result based on a data candidate. In various aspects, the artificial neural network can comprise a control neuron population that can be independent of the set of base neuron populations. In various cases, the control neuron population can modulate, during the inferencing phase or the training phase, neuronal activity of at least one base neuron population of the set of base neuron populations. In various aspects, the control neuron population can modulate the neuronal activity of the at least one base neuron population by scaling one or more operands internally produced by the at least one base neuron population.

According to one or more embodiments, the above-described artificial neural network can be implemented as a computer-implemented method or as a computer program product.

DESCRIPTION OF THE DRAWINGS

FIG. 14 illustrates a flow diagram of an example, non-limiting computer-implemented method that facilitates neuronal activity modulation of artificial neural networks in accordance with one or more embodiments described herein.

DETAILED DESCRIPTION

Figure 1:
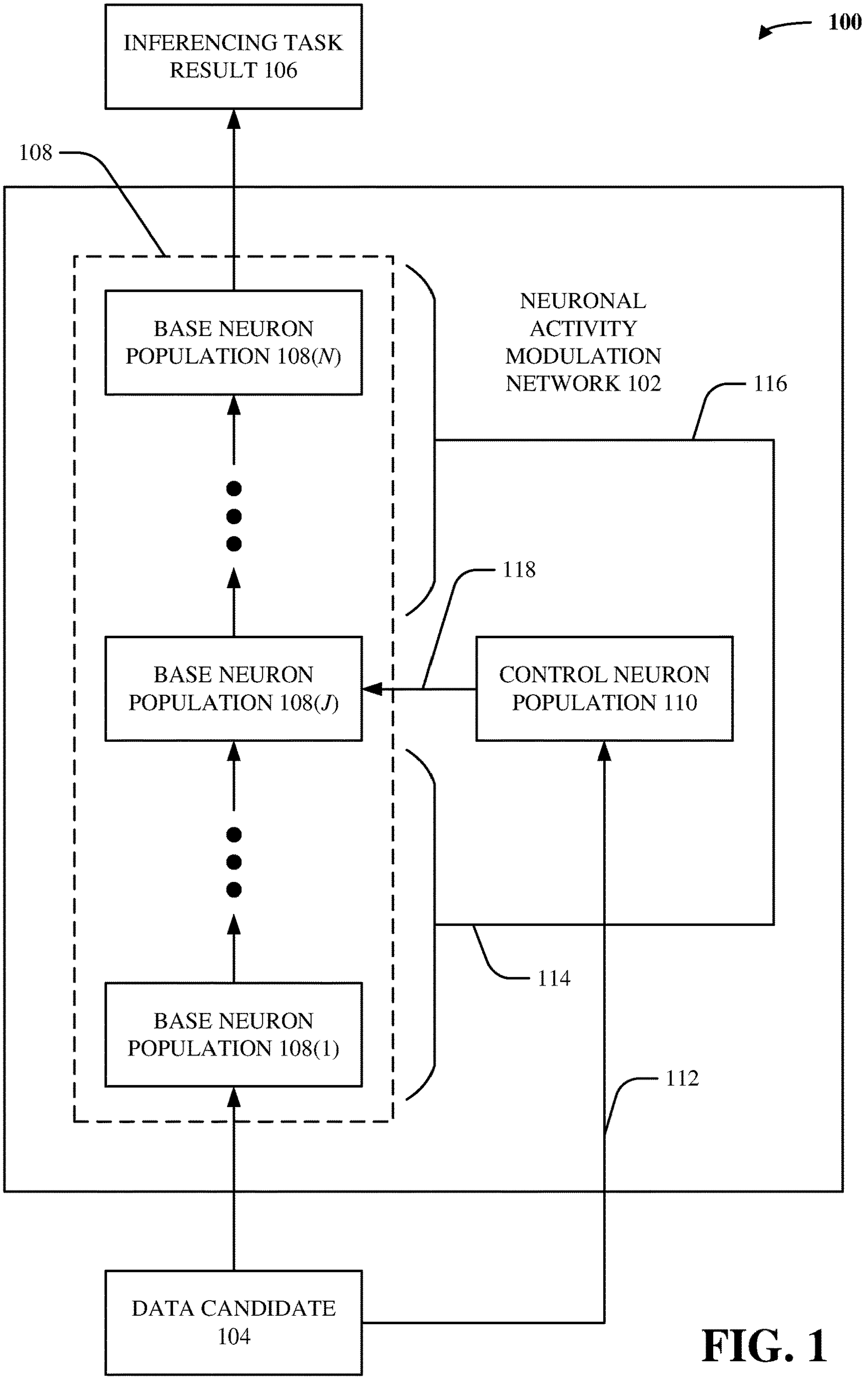
FIG. 1 illustrates a block diagram of an example, non-limiting system that facilitates neuronal activity modulation of artificial neural networks in accordance with one or more embodiments described herein.

The following detailed description is merely illustrative and is not intended to limit embodiments or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

In various embodiments, a system is provided, where the system comprises a processor and a computer-readable memory. In various aspects, an artificial neural network is stored on the computer-readable memory and is executable by the processor. In various instances, the artificial neural network comprises a set of base neuron populations that collectively generate, during an inferencing phase or a training phase of the artificial neural network, an inferencing task result based on a data candidate. In various aspects, the artificial neural network further comprises a control neuron population that is independent of the set of base neuron populations. In various aspects, the control neuron population modulates, during the inferencing phase or the training phase, neuronal activity of at least one base neuron population of the set of base neuron populations. As described herein, the at least one base neuron population can be considered like pyramidal neurons (e.g., responsible for generating neurological responses), whereas the control neuron population can instead be considered like interneurons (e.g., responsible for controlling the behaviors of pyramidal neurons). Such a construction can cause the artificial neural network to exhibit higher inferencing accuracy at a fixed computational footprint, or, equivalently, to achieve a fixed inferencing accuracy at a smaller computational footprint.

In various embodiments, the control neuron population modulates the neuronal activity of the at least one base neuron population by scaling (e.g., multiplicatively or additively) one or more operands internally produced by the at least one base neuron population. This can be considered as a specific, concrete fashion in which neuronal activity modulation can be facilitated.

In various embodiments, the at least one base neuron population receives inputs produced by one or more of the set of base neuron populations, and the control neuron population receives those inputs or a subset of those inputs. In some aspects, receipt of the same stimuli (or a subset thereof) by the control neuron population as the at least one base neuron population can help to increase inferencing accuracy at a fixed, or even reduced, computational footprint.

In various embodiments, the control neuron population receives, via bottom-up skip connections, inputs produced by one or more of the set of base neuron populations that are prior to the at least one base neuron population (e.g., whether or not those same inputs are received by the at least one base neuron population). In some aspects, this can be considered as feeding the control neuron population real-time sensory stimuli, which can help to increase inferencing accuracy at a fixed, or even reduced, computational footprint.

In various embodiments, the control neuron population receives, via top-down skip connections, inputs produced by one or more of the set of base neuron populations that are subsequent to the at least one base neuron population (e.g., whether or not those same inputs are received by the at least one base neuron population). In some aspects, this can be considered as feeding the control neuron population past neurological responses, which can help to increase inferencing accuracy at a fixed, or even reduced, computational footprint.

In various embodiments, the at least one base neuron population and the control neuron population exhibit non-uniform types of neuronal dynamics. For example, the non-uniform types of neuronal dynamics can be selected from the group consisting of perceptron dynamics, spiking neural unit dynamics, long short-term memory dynamics, gated recurrent unit dynamics, and quasi recurrent unit dynamics. Such neural diversity can help to increase inferencing accuracy at a fixed, or even reduced, computational footprint.

In various embodiments, a computer-implemented method comprises generating, by a set of base neuron populations of an artificial neural network and during an inferencing phase or a training phase of the artificial neural network, an inferencing task result based on a data candidate. In various aspects, the computer-implemented method further comprises modulating, by a control neuron population that is independent of the set of base neuron populations and during the inferencing phase or the training phase, neuronal activity of at least one base neuron population of the set of base neuron populations. As described herein, the at least one base neuron population can be considered like pyramidal neurons (e.g., responsible for generating neurological responses), whereas the control neuron population can instead be considered like interneurons (e.g., responsible for controlling the behaviors of pyramidal neurons). Such a construction can cause the artificial neural network to exhibit higher inferencing accuracy at a fixed computational footprint, or, equivalently, to achieve a fixed inferencing accuracy at a smaller computational footprint.

In various embodiments, the modulating the neuronal activity of the at least one base neuron population comprises (e.g., multiplicatively or additively) scaling, by the control neuron population, one or more operands internally produced by the at least one base neuron population. This can be considered as a specific, concrete fashion in which neuronal activity modulation can be facilitated.

In various embodiments, the at least one base neuron population receives inputs produced by one or more of the set of base neuron populations, and the control neuron population receives those inputs or a subset of those inputs. In some aspects, receipt of the same stimuli (or a subset thereof) by the control neuron population as the at least one base neuron population can help to increase inferencing accuracy at a fixed, or even reduced, computational footprint.

In various embodiments, the control neuron population receives, via bottom-up skip connections, inputs produced by one or more of the set of base neuron populations that are prior to the at least one base neuron population (e.g., whether or not those same inputs are received by the at least one base neuron population). In some aspects, this can be considered as feeding the control neuron population real-time sensory stimuli, which can help to increase inferencing accuracy at a fixed, or even reduced, computational footprint.

In various embodiments, the control neuron population receives, via top-down skip connections, inputs produced by one or more of the set of base neuron populations that are subsequent to the at least one base neuron population (e.g., whether or not those same inputs are received by the at least one base neuron population). In some aspects, this can be considered as feeding the control neuron population past neurological responses, which can help to increase inferencing accuracy at a fixed, or even reduced, computational footprint.

In various embodiments, the at least one base neuron population and the control neuron population exhibit non-uniform types of neuronal dynamics. For example, the non-uniform types of neuronal dynamics can be selected from the group consisting of perceptron dynamics, spiking neural unit dynamics, long short-term memory dynamics, gated recurrent unit dynamics, and quasi recurrent unit dynamics. Such neural diversity can help to increase inferencing accuracy at a fixed, or even reduced, computational footprint.

In various embodiments, there is a computer program product for facilitating neuronal activity modulation of artificial neural networks. In various aspects, the computer program product comprises a computer-readable memory having program instructions embodied therewith. In various instances, the program instructions are executable by a processor to cause the processor to: generate, by a set of base neuron populations of an artificial neural network and during an inferencing phase or a training phase of the artificial neural network, an inferencing task result based on a data candidate; and modulate, by a control neuron population that is independent of the set of base neuron populations and during the inferencing phase or the training phase, neuronal activity of at least one base neuron population of the set of base neuron populations. As described herein, the at least one base neuron population can be considered like pyramidal neurons (e.g., responsible for generating neurological responses), whereas the control neuron population can instead be considered like interneurons (e.g., responsible for controlling the behaviors of pyramidal neurons). Such a construction can cause the artificial neural network to exhibit higher inferencing accuracy at a fixed computational footprint, or, equivalently, to achieve a fixed inferencing accuracy at a smaller computational footprint.

In various embodiments, the control neuron population modulates the neuronal activity of the at least one base neuron population by scaling (e.g., multiplicatively or additively) one or more operands internally produced by the at least one base neuron population. This can be considered as a specific, concrete fashion in which neuronal activity modulation can be facilitated.

In various embodiments, the at least one base neuron population receives inputs produced by one or more of the set of base neuron populations, and the control neuron population receives those inputs or a subset of those inputs. In some aspects, receipt of the same stimuli (or a subset thereof) by the control neuron population as the at least one base neuron population can help to increase inferencing accuracy at a fixed, or even reduced, computational footprint.

In various embodiments, the control neuron population receives, via bottom-up skip connections, inputs produced by one or more of the set of base neuron populations that are prior to the at least one base neuron population (e.g., whether or not those same inputs are received by the at least one base neuron population). In some aspects, this can be considered as feeding the control neuron population real-time sensory stimuli, which can help to increase inferencing accuracy at a fixed, or even reduced, computational footprint.

In various embodiments, the control neuron population receives, via top-down skip connections, inputs produced by one or more of the set of base neuron populations that are subsequent to the at least one base neuron population (e.g., whether or not those same inputs are received by the at least one base neuron population). In some aspects, this can be considered as feeding the control neuron population past neurological responses, which can help to increase inferencing accuracy at a fixed, or even reduced, computational footprint.

In various embodiments, the at least one base neuron population and the control neuron population exhibit non-uniform types of neuronal dynamics. For example, the non-uniform types of neuronal dynamics can be selected from the group consisting of perceptron dynamics, spiking neural unit dynamics, long short-term memory dynamics, gated recurrent unit dynamics, and quasi recurrent unit dynamics. Such neural diversity can help to increase inferencing accuracy at a fixed, or even reduced, computational footprint.

An artificial neural network can be trained, using any suitable training paradigm (e.g., supervised training, unsupervised training, reinforcement learning), to perform an inferencing task (e.g., classification, segmentation, regression). Oftentimes, attempts to increase the inferencing accuracy of the artificial neural network include commensurately increasing its computational footprint. That is, the artificial neural network can achieve high inferencing accuracy at the cost or expense of consuming excessively many computational resources (e.g., having a large number of trainable internal parameters, consuming a large amount of processing capacity, occupying a large amount of memory storage space, requiring a large amount of training time or inferencing time). Conversely, the artificial neural network can instead consume fewer computational resources at the cost or expense of achieving reduced inferencing accuracy.

Systems or techniques that can increase inferencing accuracy of the artificial neural network while maintaining or reducing the computational footprint of the artificial neural network can be considered as desirable.

Various embodiments described herein can address one or more of these technical problems. One or more embodiments described herein can include systems, computer-implemented methods, apparatus, or computer program products that can facilitate neuronal activity modulation of artificial neural networks. More specifically, the inventors of various embodiments described herein realized that the inferencing accuracy of an artificial neural network can be increased even as the computational footprint of that artificial neural network is maintained or even decreased, if some neurons of the artificial neural network modulate, control, or otherwise influence the behaviors of other neurons in the artificial neural network, and if the internal dynamics implemented by such neurons are diverse, varied, or different from each other.

In particular, various embodiments described herein can involve conceptually separating the neurons of an artificial neural network into two separate populations: a base population and a control population. In various aspects, the neurons belonging to the base population can receive as inputs whatever activations are supplied from previous layers of the artificial neural network, can generate their own activations based on those inputs, and can supply those generated activations as new inputs to subsequent layers of the artificial neural network. In contrast, the neurons belonging to the control population can receive as inputs whatever activations are supplied from previous layers of the artificial neural network, can generate their own activations based on those inputs, but can refrain from supplying those generated activations as new inputs to subsequent layers of the artificial neural network. Instead, those activations generated by the neurons of the control population can be treated as modulatory signals by neurons of the base population. As described herein, such modulatory signals can, in some aspects, be used to multiplicatively scale operands that are internally computed by the neurons of the base population. In this way, the base population can be considered as functioning like pyramidal neurons, while the control population can be considered as functioning like interneurons.

Note that the artificial neural network can be conceptually separated into the base population and into the control population, regardless of the specific neuronal dynamics implemented in the base population and in the control population. Accordingly, the base population and the control population can each comprise neurons exhibiting any suitable types of neuronal dynamics (e.g., perceptron dynamics, spiking neural unit (SNU) dynamics, long short-term memory (LSTM) dynamics, gated recurrent unit (GRU) dynamics, quasi recurrent unit (QRU) dynamics). So, the neurons of the control population can be of the same or different types as each other, the neurons of the base population can be of the same or different types as each other, and the neurons of the control population can be of the same or different types as the neurons of the base population. In this way, the base population and the control population can be free to exhibit any suitable neuronal dynamic diversity as desired.

As experimentally verified by the present inventors, when an artificial neural network is structured as described herein (e.g., so as to emulate interneurons and neural diversity), the artificial neural network can exhibit increased inferencing accuracy at a given computational footprint, or, equivalently, can exhibit a smaller computational footprint at a given inferencing accuracy.

Various embodiments described herein can be considered as an improved structure or architecture according to which a deep learning neural network can be built. In various aspects, the deep learning neural network can be configured to perform an inferencing task on a data candidate. In various instances, the data candidate can be any suitable electronic data exhibiting any suitable format, size, or dimensionality. As some non-limiting examples, a data candidate can be an image, a video, an audio waveform, or a text string. In various cases, the inferencing task can be any suitable computational, predictive task that can be performed on or with respect to a data candidate. As some non-limiting examples, the inferencing task can be classification, segmentation, or regression (e.g., denoising, resolution enhancement, natural language processing). Accordingly, the deep learning neural network can be executed on the data candidate, and such execution can cause the deep learning neural network to produce an inferencing task result. In various aspects, the inferencing task result can be any suitable electronic data whose format, size, or dimensionality can depend upon the inferencing task. For example, if the inferencing task is classification, then the inferencing task result can be a classification label that the deep learning neural network has predicted or inferred for the data candidate. As another example, if the inferencing task is segmentation, then the inferencing task result can be a segmentation mask that the deep learning neural network has predicted or inferred for the data candidate. As yet another example, if the inferencing task is regression, then the inferencing task result can be a regression output (e.g., one or more continuously variable scalars) that the deep learning neural network has predicted or inferred for the data candidate.

No matter the inferencing task, the deep learning neural network can comprise a set of base neuron populations. In various aspects, the set of base neuron populations can comprise any suitable number of base neuron populations. In various instances, a base neuron population can comprise any suitable number of neurons that can be arranged serially or in parallel with each other. Furthermore, the neurons of a base neuron population can exhibit any suitable type or types of neuronal dynamics (e.g., the base neuron population can include perceptrons, SNUs, or LSTM cells). In various cases, the set of base neuron populations can be arranged sequentially with respect to each other. Thus, one base neuron population can be considered as forming or otherwise belonging to an input layer (e.g., first, bottom-most, or most upstream layer) of the deep learning neural network. Likewise, another base neuron population can be considered as forming or otherwise belonging to an output layer (e.g., last, top-most, or most downstream layer) of the deep learning neural network. Moreover, the remaining base neuron populations can be considered as forming or otherwise belonging to hidden layers of the deep learning neural network. In various aspects, any of such layers can be coupled together via any suitable types of interlayer connections (e.g., forward connections, skip connections, recurrent connections). For ease of explanation, any hidden layers of the deep learning neural network can be considered as receiving inputs from one or more preceding (e.g., upstream) layers and as providing outputs to one or more subsequent (e.g., downstream) layers.

In various aspects, the deep learning neural network can comprise a control neuron population. In various instances, the control neuron population can comprise any suitable number of neurons that can be arranged serially or in parallel with each other. Furthermore, the neurons of the control neuron population can exhibit any suitable type or types of neuronal dynamics (e.g., the control neuron population can include perceptrons, SNUs, LSTM cells, GRUs, or QRUs). In various cases, the control neuron population can be outside of, independent from, or otherwise not part of the set of base neuron populations. In various aspects, the control neuron population can be considered as being in parallel with any given one of the set of base neuron populations. Thus, the control neuron population and that given base neuron population can, in some aspects, be considered as collectively forming or belonging to the same layer as each other.

As mentioned above, the given base neuron population can receive inputs from one or more preceding layers and can supply outputs to one or more subsequent layers. Like the given base neuron population, the control neuron population can receive inputs from one or more preceding layers (e.g., in some cases, the control neuron population and the given base neuron population can receive the same inputs as each other). However, unlike the given base neuron population, the control neuron population can refrain from supplying outputs to one or more subsequent layers. Instead, the outputs of the control neuron population can be treated or otherwise interpreted as modulatory signals that control, alter, or otherwise affect the behavior of the given base neuron population.

More specifically, the given base neuron population can receive inputs from one or more preceding layers, can internally process (e.g., via whatever neuronal dynamics are implemented in the given base neuron population) those inputs into outputs, and can supply those outputs to one or more subsequent layers. The internal processing of the inputs by the given base neuron population can involve sequential or parallel computation of any suitable number of operands, where an operand can be any suitable numerical quantity (e.g., scalar, vector, matrix, tensor) on which any suitable mathematical operations can be performed. Note that the performance of a mathematical operation on an operand can be considered as creating a new operand on which other mathematical operations can subsequently be performed.

For example, the given base neuron population can apply trainable weight matrices to its received inputs via matrix multiplication, and the products of such matrix multiplication can be considered as one or more first operands. In various aspects, the given base neuron population can apply bias vectors to the one or more first operands via vector addition, and the results of such vector addition can be considered as one or more second operands. In various instances, the given base neuron population can apply activation functions to the one or more second operands, and the results of such activation functions can be considered as one or more third operands. In other words, the given base neuron population can process its received inputs by sequential (or, in some cases, parallel) application of mathematical operations or functions, which can be considered as yielding various operands. In some cases, such operands can be considered or referred to as being internally computed by the given base neuron population.

In various aspects, the outputs of the control neuron population can modulate neuronal activity of the given base neuron population, by multiplicatively scaling up or down any of the operands that are internally computed by the given base neuron population. In various instances, multiplicative scaling of a last or final operand internally computed by the given base neuron population can be considered or referred to as output-side neuronal activity modulation. Conversely, multiplicative scaling of a first or initial operand internally computed by the given base neuron population can be considered or referred to as input-side neuronal activity modulation. Likewise, multiplicative scaling of any other operands internally computed by the given base neuron population can be considered or referred to as intermediate-side neuronal activity modulation. In any case, the control neuron population performing multiplicative scaling of at least one operand internally computed by the given base neuron population can influence the outputs produced by the given base neuron population, which can commensurately influence the inferencing task result.

Accordingly, unlike the given base neuron population, the control neuron population can be considered as not directly generating the inferencing task result (e.g., the outputs of the control neuron population can be not supplied as new inputs to subsequent layers). Instead, the control neuron population can be considered as indirectly contributing to such generation, by altering at least one internally computed operand, and thus by altering the behavior, of the given base neuron population.

Note that, as mentioned above, the given base neuron population and the control neuron population can each comprise any suitable type or types of neuronal dynamics. Thus, in some aspects, it can be the case that the neurons in the given base neuron population can exhibit different types of neuronal dynamics as compared to the neurons in the control neuron population. In other words, the control neuron population can be considered as exhibiting neuronal dynamics that are diverse or non-uniform with respect to the given base neuron population (e.g., the control neuron population can comprise perceptrons, while the given base neuron population can comprise SNUs). Furthermore, in some instances, it can be the case that some neurons in the control neuron population can exhibit different types of neuronal dynamics as compared to other neurons in the control neuron population. That is, the control neuron population can be considered as exhibiting diverse or non-uniform neuronal dynamics with respect to itself (e.g., some neurons in the control neuron population can be GRUs, while other neurons in the control neuron population can be SNUs). Further still, in some aspects, it can be the case that some neurons in the given base neuron population can exhibit different types of neuronal dynamics as compared to other neurons in the given base neuron population. In other words, the given base neuron population can be considered as exhibiting diverse or non-uniform neuronal dynamics with respect to itself (e.g., some neurons in the given base neuron population can be QRUs, while other neurons in the given base neuron population can be LSTM cells). In this way, the deep learning neural network can exhibit neural diversity.

As experimentally verified by the present inventors, implementation of the control neuron population can cause the deep learning neural network to exhibit richer functionality or learning capabilities. In particular, experimental results of the present inventors indicate that implementation of the control neuron population can cause the deep learning neural network to achieve higher inferencing accuracy without commensurate growth in computational footprint, or, equivalently, can cause the deep learning neural network to achieve a smaller computational footprint without commensurate deterioration of inferencing accuracy.

Various embodiments described herein can be employed to use hardware or software to solve problems that are highly technical in nature (e.g., to facilitate neuronal activity modulation of artificial neural networks), that are not abstract and that cannot be performed as a set of mental acts by a human. Further, some of the processes performed can be performed by a specialized computer (e.g., a deep learning neural network having artificial neurons characterized by trainable internal parameters such weight matrices or bias vectors) for carrying out defined acts related to artificial neural networks.

For example, such defined acts can include: generating, by a set of base neuron populations of an artificial neural network and during an inferencing phase or a training phase of the artificial neural network, an inferencing task result based on a data candidate; and modulating, by a control neuron population that is independent of the set of base neuron populations and during the inferencing phase or the training phase, neuronal activity of at least one base neuron population of the set of base neuron populations. In various aspects, the modulating the neuronal activity of the at least one base neuron population can comprise: scaling, by the control neuron population, one or more operands internally produced by the at least one base neuron population.

Such defined acts are not performed manually by humans. Indeed, neither the human mind nor a human with pen and paper can electronically execute an artificial neural network on a data candidate so as to generate an inferencing task result, where the artificial neural network is structured to have base neuron populations (e.g., base neurons) whose activities or behaviors are modulated by a control neuron population (e.g., control neurons). Indeed, an artificial neural network whose architecture includes some neurons whose neuronal activity is modulated by other neurons is an inherently-computerized construct that simply cannot be meaningfully executed, trained, or otherwise implemented in any way by the human mind without computers.

Moreover, various embodiments described herein can integrate into a practical application various teachings relating to neuronal activity modulation of artificial neural networks. As explained above, an artificial neural network constructed according to existing techniques can suffer deterioration in inferencing accuracy as the computational footprint (e.g., total number of trainable parameters, consumption of processing or memory capacity, consumption of inferencing time) of the artificial neural network shrinks. This can be considered as disadvantageous or undesirable.

Various embodiments described herein can address or ameliorate this technical problem. Specifically, various embodiments described herein can be considered as novel architectures according to which an artificial neural network can be constructed. In particular, various embodiments described herein can involve structuring the artificial neural network so as to have two distinct populations of neurons. One of such two distinct populations can be referred to as a base population, and the other of such two distinct populations can be referred to as a control population. In various aspects, the neurons of the base population can directly process a data candidate into an inferencing task result. In other words, the data candidate can complete a forward pass through the base population, and such forward pass can cause the base population to produce the inferencing task result. In contrast, the neurons of the control population can refrain from participating in the direct processing of the data candidate into the inferencing task result. Instead, the neurons of the control population can modulate, control, or otherwise influence the activity of the base population. In some cases, as described herein, the control population can facilitate such modulation, control, or influence by multiplicatively scaling internally computed operands of the base population.

Furthermore, as described herein, the artificial neural network can be structured to have the base population and the control population, regardless of whatever specific neuronal dynamics are implemented in those populations. Accordingly, in various aspects, different, diverse, or otherwise non-uniform neuronal dynamics can be implemented in the base population or in the control population (e.g., some base or control neurons can be perceptrons, other base or control neurons can be SNUs, yet other base or control neurons can be LSTM cells). Thus, the artificial neural network can, in various cases, be considered as exhibiting neuronal dynamic diversity.

As experimentally verified by the present inventors, structuring the artificial neural network with the control population as described herein can cause the artificial neural network to exhibit increased inferencing accuracy or decreased computational footprint. For instance, suppose that, without the control population, the artificial neural network would exhibit a baseline level of inferencing accuracy at a baseline computational footprint. Implementation of the control population as described herein can allow the artificial neural network to achieve the baseline level of inferencing accuracy at a computational footprint that is smaller than the baseline computational footprint. Equivalently, implementation of the control population as described herein can allow the artificial neural network to achieve, at the baseline computational footprint, an inferencing accuracy that is higher than the baseline level. For at least these reasons, various embodiments described herein certainly constitute concrete and tangible technical improvements in the field of artificial neural networks, and such embodiments therefore clearly qualify as useful and practical applications of computers.

Furthermore, various embodiments described herein can control real-world tangible devices based on the disclosed teachings. For example, various embodiments described herein can electronically execute or train real-world deep learning neural networks.

It should be appreciated that the herein figures and description provide non-limiting examples of various embodiments and are not necessarily drawn to scale.

FIG. 1 illustrates a block diagram of an example, non-limiting system 100 that can facilitate neuronal activity modulation of artificial neural networks in accordance with one or more embodiments described herein.

In at least some embodiments, the system 100 includes a neuronal activity modulation network 102, which can be stored on any suitable computer-readable memory and executed by any suitable processor. In various aspects, the neuronal activity modulation network 102 can be any suitable artificial neural network that can be configured to receive as input a data candidate 104 and to produce as output an inferencing task result 106.

In various embodiments, the data candidate 104 can be any suitable electronic data having any suitable format, size, or dimensionality. In other words, the data candidate 104 can be one or more scalars, one or more vectors, one or more matrices, one or more tensors, one or more character strings, or any suitable combination thereof. As a non-limiting example, the data candidate 104 can be one or more two-dimensional images (e.g., one or more pixel arrays). As another non-limiting example, the data candidate 104 can be one or more three-dimensional images (e.g., one or more voxel arrays). As yet another non-limiting example, the data candidate 104 can be one or more electronic audio files (e.g., one or more timeseries of pressure values or decibel values). As still another non-limiting example, the data candidate 104 can be waveform-spectra (e.g., data represented in a frequency-domain instead of a time-domain). As even another non-limiting example, the data candidate 104 can be an electronic textual file (e.g., one or more strings of text). As another non-limiting example, the data candidate 104 can be any suitable combination of the above-mentioned examples.

In various embodiments, the inferencing task result 106 can be any suitable electronic data having any suitable format, size, and/or dimensionality. That is, the inferencing task result 106 can be one or more scalars, one or more vectors, one or more matrices, one or more tensors, one or more character strings, or any suitable combination thereof. In various aspects, the inferencing task result 106 can be considered as an inference, prediction, or forecast that the neuronal activity modulation network 102 has determined corresponds to the data candidate 104. Accordingly, the format, size, or dimensionality of the inferencing task result 106 can depend upon whatever inferencing task that the neuronal activity modulation network 102 is configured to perform. As a non-limiting example, the inferencing task can be classification. In such case, the inferencing task result 106 can be a classification label that the neuronal activity modulation network 102 predicts or infers should correspond to the data candidate 104. As another non-limiting example, the inferencing task can be segmentation. In such case, the inferencing task result 106 can be a segmentation mask that the neuronal activity modulation network 102 predicts or infers should correspond to the data candidate 104. As even another non-limiting example, the inferencing task can be regression. In such case, the inferencing task result 106 can be a regression output that the neuronal activity modulation network 102 predicts or infers should correspond to the data candidate 104 (e.g., can be a denoised version of the data candidate 104, can be a resolution enhanced version of the data candidate 104, can be a translated or transformed version of the data candidate 104, can be a forecast related to the data candidate 104). As yet another non-limiting example, the inferencing task result 106 can be any suitable combination of the aforementioned.

In various embodiments, as shown, the neuronal activity modulation network 102 can comprise a set of base neuron populations 108. In various aspects, the set of base neuron populations 108 can comprise n populations for any suitable positive integer n: a base neuron population 108(1) to a base neuron population 108(*n*). In various instances, each of the set of base neuron populations 108 can be a collection or group of any suitable number of neurons that can be arranged in any suitable fashion. As a non-limiting example, the base neuron population 108(1) can be a first collection or group of neurons that can be arranged in parallel or in series with each other. As another non-limiting example, the base neuron population 108(*n*) can be an n-th collection or group of neurons that can be arranged in parallel or in series with each other. In various cases, any two of the set of base neuron populations 108 can have the same or different numbers or arrangements of neurons as each other.

Although not explicitly shown in FIG. 1 for ease of illustration, note that any of the set of base neuron populations 108 can be considered as being made up of multiple sub-populations of neurons. As a non-limiting example, the neurons of the base neuron population 108(1) can be considered as being divided into two or more first sub-populations of neurons, which sub-populations can be arranged in series, in parallel, or in any other suitable fashion with respect to each other. As another non-limiting example, the neurons of the base neuron population 108(*n*) can be considered as being divided into two or more n-th sub-populations of neurons, which sub-populations can be arranged in series, in parallel, or in any other suitable fashion with respect to each other.

In various aspects, as shown, the set of base neuron populations 108 can be considered as being sequentially ordered within the neuronal activity modulation network 102, so as to form, be part of, or otherwise serve as ordered layers of the neuronal activity modulation network 102. That is, the base neuron population 108(1) can be considered as forming, being part of, or otherwise serving as an input layer (e.g., a bottom-most layer or a most upstream layer) of the neuronal activity modulation network 102. Conversely, the base neuron population 108(*n*) can be considered as forming, being part of, or otherwise serving as an output layer (e.g., a top-most layer or a most downstream layer) of the neuronal activity modulation network 102. Relatedly, any others of the set of base neuron populations 108 (e.g., a base neuron population 108(2), not shown, to a base neuron population 108(*n*−1), not shown) can be considered as forming, being part of, or otherwise serving as respective hidden layers of the neuronal activity modulation network 102.

In various aspects, the set of base neuron populations 108 can be coupled together via any suitable interlayer connections. As a non-limiting example, any adjacent pairs of the set of base neuron populations 108 can be coupled together via one or more forward connections. As another non-limiting example, any non-adjacent pairs of the set of base neuron populations 108 can be coupled together via one or more skip connections. Note that such skip connections can be implemented in any suitable direction. For instance, some of such skip connections can be implemented in a downstream direction (e.g., away from the base neuron population 108(1) and toward the base neuron population 108(*n*)), which can also be referred to as a bottom-up direction. In other cases, however, some of such skip connections can be implemented in an upstream direction (e.g., away from the base neuron population 108(*n*) and toward the base neuron population 108(1)), which can also be referred to as a top-down direction. As yet another non-limiting example, any of the set of base neuron populations 108 can be coupled to itself by one or more recurrent connections.

In any case, the neuronal activity modulation network 102 can be executed on the data candidate 104, so as to generate the inferencing task result 106. In such execution, the set of base neuron populations 108 can be considered as being responsible for directly processing or converting the data candidate 104 into the inferencing task result 106. More specifically, such execution can involve the data candidate 104 completing a forward pass through the set of base neuron populations 108. More specifically still, the base neuron population 108(1) can receive as input the data candidate 104, the neurons of the base neuron population 108(1) can operate on the data candidate 104, thereby yielding various outputs, and such outputs can be fed to the base neuron population 108(2). In turn, the base neuron population 108(2) can receive as input the outputs produced by the base neuron population 108(1), the neurons of the base neuron population 108(2) can operate on such input, thereby yielding various outputs, and such outputs can be fed to a base neuron population 108(3) (not shown). Continuing in this fashion, the base neuron population 108(*n*) can receive whatever outputs are produced by the base neuron population 108(*n*−1), and the neurons of the base neuron population 108(*n*) can operate on such outputs, thereby yielding the inferencing task result 106.

Although not shown for ease of illustration, note that any of the set of base neuron populations 108 can receive as input not just the outputs produced by the previous base neuron population (or not just the data candidate 104, in the case of the base neuron population 108(1)), but can also receive as input any previous outputs produced by itself (e.g., such previous outputs can be received via recurrent connections) or any outputs currently or previously produced by any other of the set of base neuron populations 108 (e.g., such outputs can be received by top-down or bottom-up skip connections).

In various embodiments, as shown, the neuronal activity modulation network 102 can comprise a control neuron population 110. In various aspects, the control neuron population 110 can be a collection or group of any suitable number of neurons that can be arranged in any suitable fashion (e.g., that can be arranged in parallel or in series with each other). In various instances, the control neuron population 110 can have the same or different numbers or arrangements of neurons as any of the set of base neuron populations 108. Although not explicitly shown in FIG. 1 for ease of illustration, note that the control neuron population 110, just like any of the set of base neuron populations 108, can be considered as being made up of multiple sub-populations of neurons. That is, the neurons of the control neuron population 110 can be considered as being divided into two or more sub-populations of neurons, which sub-populations can be arranged in series, in parallel, or in any other suitable fashion with respect to each other.

In various aspects, the control neuron population 110 is outside of, independent from, separate/distinct from, and/or otherwise not part of the set of base neuron populations 108. In some instances, the control neuron population 110 can be considered as being in parallel with any of the set of base neuron populations 108. Such base neuron population can be referred to as a base neuron population 108(*j*), for any suitable positive integer $1 \leq j \leq n$. Accordingly, the control neuron population 110 and the base neuron population 108(*j*) can, in some instances, be considered as collectively forming or otherwise serving as the j-th layer of the neuronal activity modulation network 102.

As mentioned above, execution of the neuronal activity modulation network 102 can involve the data candidate 104 completing a forward pass through the set of base neuron populations 108, and such forward pass can produce the inferencing task result 106. Thus, the base neuron population 108(*j*) can be considered as directly contributing to the generation of the inferencing task result 106. Unlike the base neuron population 108(*j*), the control neuron population 110 can, in various aspects, refrain from directly contributing to the generation of the inferencing task result 106. Instead, the control neuron population 110 can, in various instances, indirectly affect the inferencing task result 106 by modulating the internal neuronal activity of the base neuron population 108(*j*).

More specifically, the control neuron population 110 can receive any suitable inputs. As a non-limiting example, the control neuron population 110 can receive as input the data candidate 104, as illustrated by numeral 112. As another non-limiting example, the control neuron population 110 can receive as input whatever outputs are produced by any of the set of base neuron populations 108 that precede (e.g., that are below or, equivalently, upstream of) the base neuron population 108(*j*), as illustrated by numeral 114. Note that numerals 112 and 114 can, in some cases, be considered as representing bottom-up connections (e.g., a bottom-up forward connection from a base neuron population 108(*j*−1), not shown, or bottom-up skip connections from any of the base neuron population 108(1) to a base neuron population 108(*j*−2), not shown). As even another non-limiting example, the control neuron population 110 can receive as input whatever outputs were previously produced (e.g., during a previous execution of the neuronal activity modulation network 102, or during a previous recurrent iteration of the neuronal activity modulation network 102) by any of the set of base neuron populations 108 that follow (e.g., that are above or, equivalently, downstream of) the base neuron population 108(*j*), as illustrated by numeral 116. Note that numeral 116 can, in some cases, be considered as representing top-down connections (e.g., a direct top-down connection from a base neuron population 108(*j*+1), not shown, or top-down skip connections from any of a base neuron population 108(*j*+2), not shown, to the base neuron population 108(*n*)). In some instances, the control neuron population 110 can receive inputs via any suitable combination of the aforementioned (e.g., via any suitable combination of 112, 114, and 116).

No matter the inputs of the control neuron population 110, the neurons of the control neuron population 110 can operate on such inputs, thereby yielding various outputs. However, unlike the outputs of the base neuron population 108(*j*), the outputs of the control neuron population 110 can, in various aspects, not be fed as traditional inputs to subsequent ones of the set of base neuron populations 108. Instead, the outputs of the control neuron population 110 can be fed as modulatory signals to the base neuron population 108(*j*), as illustrated via numeral 118. In other words, such modulatory signals can control, alter, or modulate the neuronal activity of the base neuron population 108(*j*). In particular, such modulatory signals can be implemented to multiplicatively scale operands that are internally computed by the base neuron population 108(*j*). Non-limiting aspects are described with respect to FIGS. 2-4.

Figure 2:
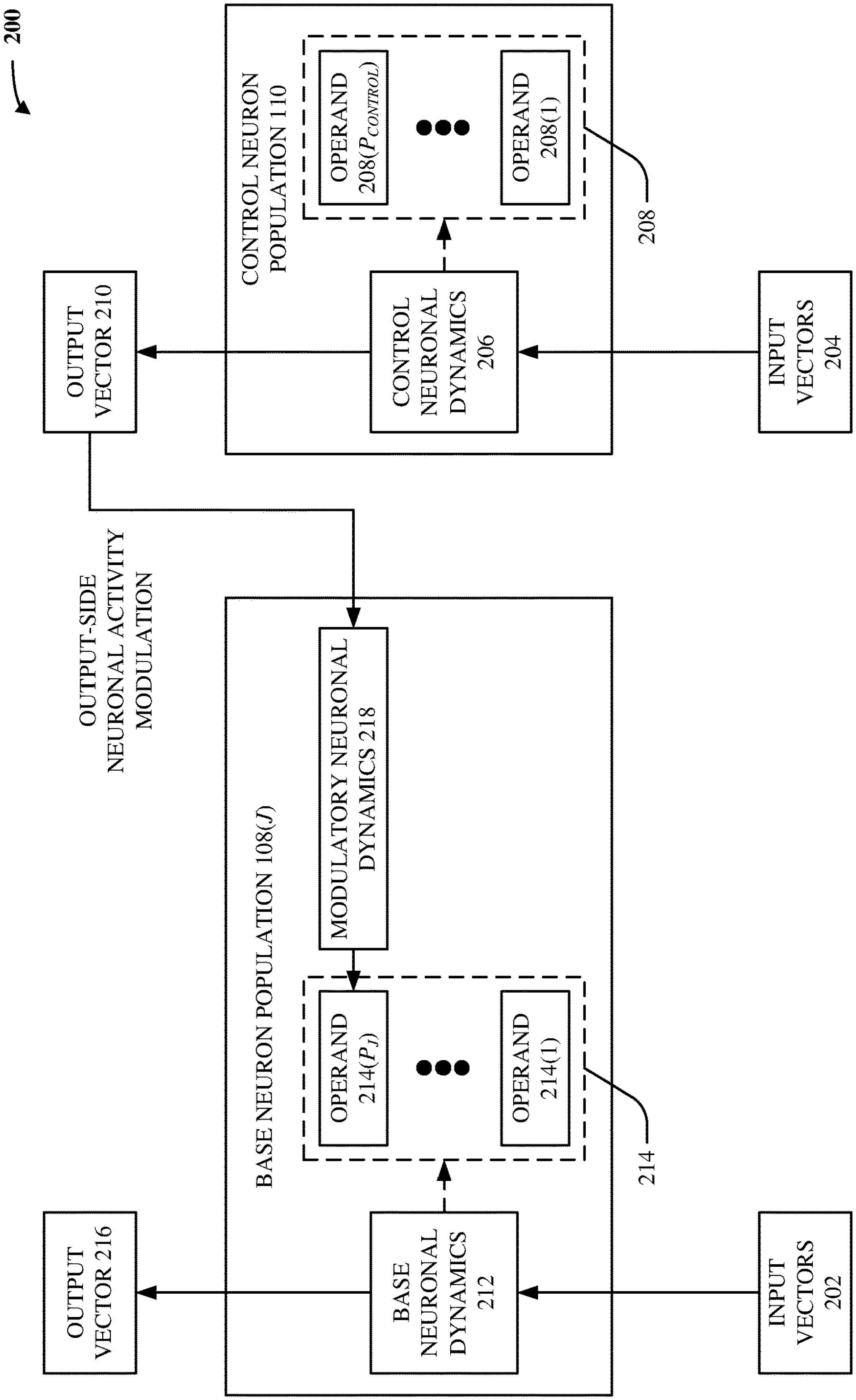
FIGS. 2-4 illustrate example, non-limiting block diagrams respectively showing how output-side, input-side, and intermediate-side neuronal activity modulation of artificial neural networks can be facilitated in accordance with one or more embodiments described herein.
Figure 3:
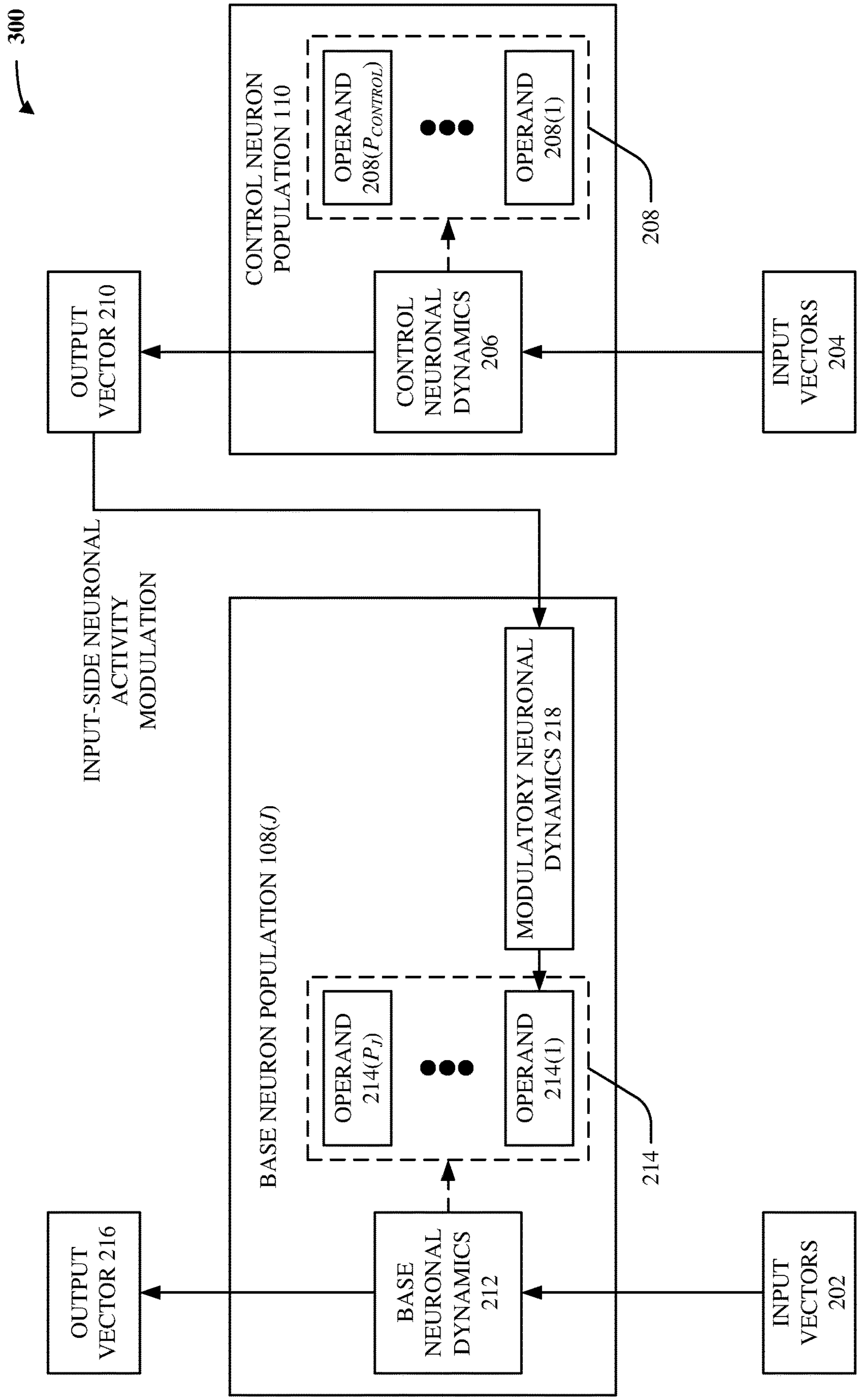
Figure 4:
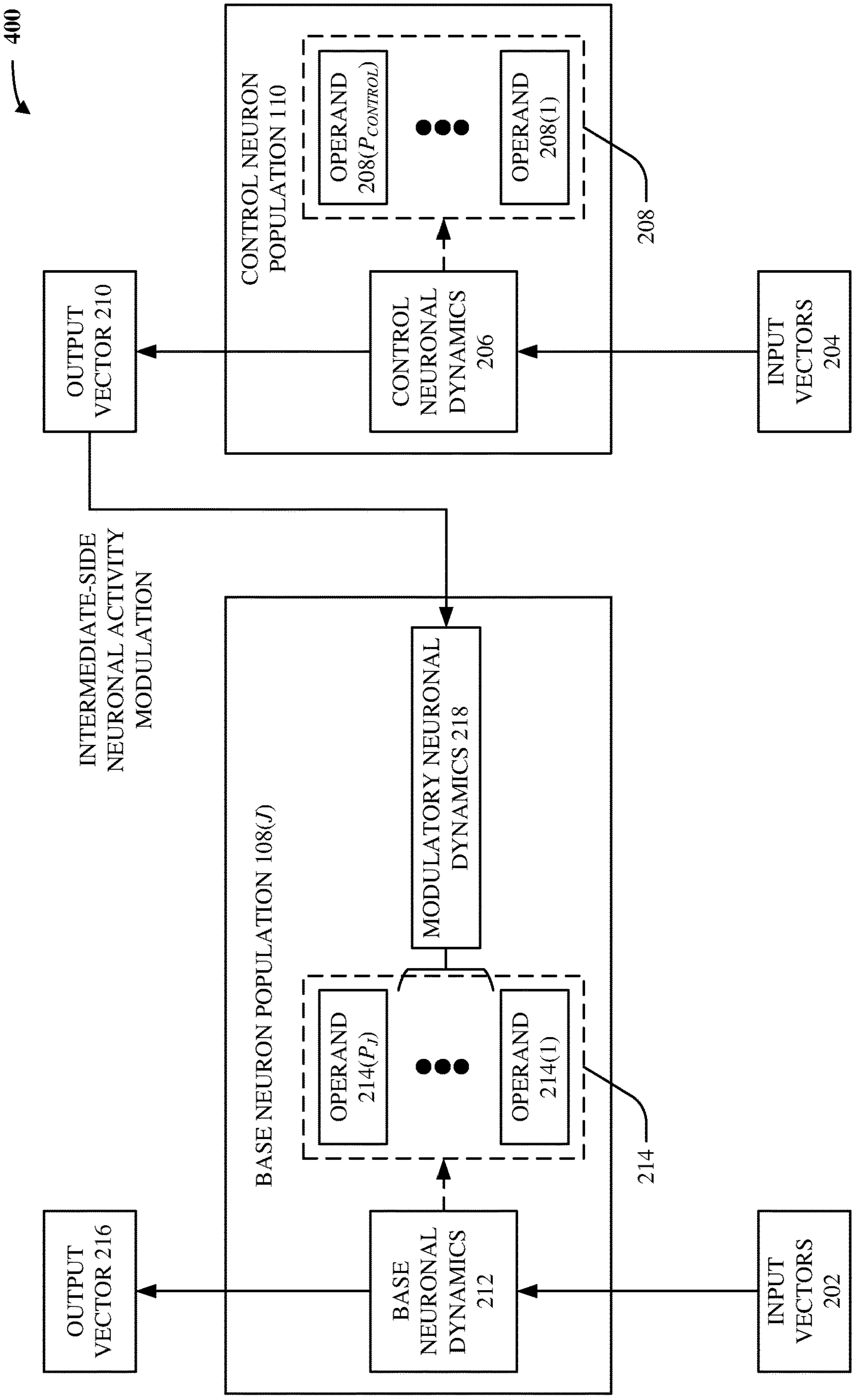

FIGS. 2-4 illustrate example, non-limiting block diagrams 200, 300, and 400 showing how neuronal activity modulation of artificial neural networks can be facilitated in accordance with one or more embodiments described herein.

First, consider FIG. 2. In various embodiments, one or more input vectors 202 are received by or fed to the base neuron population 108(*j*). In various aspects, the one or more input vectors 202 can comprise any suitable number of vectors, each of which can have any suitable numbers of numerical elements. In various instances, the one or more input vectors 202 can be considered as being or otherwise representing whatever inputs are currently received by the base neuron population 108(*j*). Accordingly, if j=1, then the one or more input vectors 202 can comprise the data candidate 104 (e.g., a vectorized or reformatted version of the data candidate 104). Instead, if j>1, then the one or more input vectors 202 can comprise whatever outputs are produced by the base neuron population 108(*j*−1). However, due to implementation of skip connections or recurrent connections, the one or more input vectors 202 can, in various aspects, comprise any other outputs produced by any others of the set of base neuron populations 108, no matter the value of j. As a non-limiting example, the one or more input vectors 202 can comprise outputs produced by any of the base neuron population 108(1) to the base neuron population 108(*j*−2); such outputs can be fed to the base neuron population 108(*j*) via bottom-up skip connections. As another non-limiting example, the one or more input vectors 202 can comprise outputs previously produced by the base neuron population 108(*j*) itself; such outputs can be fed to the base neuron population 108(*j*) via recurrent connections. As yet another non-limiting example, the one or more input vectors 202 can comprise outputs previously produced by any of the base neuron population 108(*j*+1) to the base neuron population 108(*n*); such outputs can be fed to the base neuron population 108(*j*) via top-down direct connections or top-down skip connections. In any case, the one or more input vectors 202 can be whatever inputs are received by the base neuron population 108(*j*).

In various aspects, there can be one or more input vectors 204. In various aspects, the one or more input vectors 204 can comprise any suitable number of vectors, each of which can have any suitable numbers of numerical elements. In various instances, the one or more input vectors 204 can be considered as being or otherwise representing whatever inputs are currently received by the control neuron population 110. As a non-limiting example, the one or more input vectors 204 can, in some cases, comprise the data candidate 104, which can be fed to the control neuron population 110 as shown via numeral 112. As another non-limiting example, the one or more input vectors 204 can, in some cases, comprise outputs produced by any of the base neuron population 108(1) to the base neuron population 108(*j*−1), which can be fed to the control neuron population 110 as shown via numeral 114. As still another non-limiting example, the one or more input vectors 204 can, in some cases, comprise outputs previously produced by any of the base neuron population 108(*j*+1) to the base neuron population 108(*n*), which can be fed to the control neuron population 110 as shown via numeral 116. In some instances, the one or more input vectors 204 can be equivalent to, or can be a subset (e.g., sub-vectors) of, the one or more input vectors 202. In any case, the one or more input vectors 204 can be whatever inputs are received by the control neuron population 110.

In various aspects, there can be an output vector 210. In various instances, the output vector 210 can be a vector having any suitable number of numerical elements. In various cases, the output vector 210 can be considered as being or otherwise representing whatever output is produced by the control neuron population 110 based on the one or more input vectors 204.

In various aspects, the control neuron population 110 can process the one or more input vectors 204 into the output vector 210, via control neuronal dynamics 206. In various instances, the control neuronal dynamics 206 can be or otherwise comprise whatever mathematical tools are implementable or employable by the neurons of the control neuron population 110. In various cases, the control neuronal dynamics 206 can comprise any suitable mathematical operators, such as matrix multiplication operators, element-wise vector multiplication operators, dot-product operators, cross-product operators, or vector addition operators. In various aspects, the control neuronal dynamics 206 can comprise any suitable trainable parameters, such as trainable weight matrices, trainable bias vectors, trainable convolutional kernels, trainable scale factors, or trainable shift factors. In various instances, the control neuronal dynamics 206 can comprise any suitable activation functions, such as sigmoid functions, softmax functions, hyperbolic tangent functions, or rectified linear unit functions. Non-limiting examples of the control neuronal dynamics 206 can be perceptron dynamics, SNU dynamics, LSTM dynamics, GRU dynamics, QRU dynamics, or any suitable combination thereof.

In various aspects, during processing of the one or more input vectors 204, the control neuronal dynamics 206 can be considered as computing or calculating a set of operands

208. In various instances, the set of operands 208 can comprise $p_{control}$ operands, for any suitable positive integer $p_{control}$; an operand 208(1) to an operand 208($p_{control}$). In various cases, each of the set of operands 208 can be any suitable scalar, vector, matrix, or tensor that the control neuronal dynamics 206 can compute or calculate by applying a respective trainable parameter, a respective mathematical operator, or a respective activation function either to the one or more input vectors 204 or to a previous one of the set of operands 208. As a non-limiting example, the operand 208(1) can be considered as a first or initial operand created by the control neuronal dynamics 206. That is, the control neuronal dynamics 206 can apply a first trainable parameter, mathematical operator, or activation function to the one or more input vectors 204, and the computational result of such application can be the operand 208(1). As another non-limiting example, the control neuronal dynamics 206 can apply a second trainable parameter, mathematical operator, or activation function to the operand 208(1), and the computational result of such application can be an operand 208(2) (not shown). Continuing in this fashion, and as even another non-limiting example, the control neuronal dynamics 206 can apply a $p_{control}$-th trainable parameter, mathematical operator, or activation function to an operand 208($p_{control}-1$) (not shown), and the computational result of such application can be the operand 208($p_{control}$), which can be a last or final operand computed by the control neuronal dynamics 206. In some cases, the operand 208($p_{control}$) (e.g., the last or final operand computed by the control neuronal dynamics 206) can be equal to the output vector 210. Note that, in some aspects, two or more of the set of operands 208 can be computed simultaneously or otherwise in parallel with each other by the control neuronal dynamics 206. In various instances, each of the set of operands 208 can be considered as representing a respective stepping stone along the processing journey from the one or more input vectors 204 to the output vector 210.

In various aspects, there can be an output vector 216. In various instances, the output vector 216 can be a vector having any suitable number of numerical elements. In various cases, the output vector 216 can be considered as being or otherwise representing whatever output is produced by the base neuron population 108($j$) based on the one or more input vectors 202. Accordingly, the base neuron population 108($j$) can supply the output vector 216 to subsequent (or, in some cases, previous) ones of the set of base neuron populations 108.

In various aspects, the base neuron population 108($j$) can process the one or more input vectors 202 into the output vector 216, via base neuronal dynamics 212. In various instances, the base neuronal dynamics 212 can be or otherwise comprise whatever mathematical tools are implementable or employable by the neurons of the base neuron population 108($j$). Accordingly, the base neuronal dynamics 212 can comprise any suitable mathematical operators (e.g., matrix multiplication operators, element-wise vector multiplication operators, dot-product operators, cross-product operators, vector addition operators), can comprise any suitable trainable parameters (e.g., trainable weight matrices, trainable bias vectors, trainable convolutional kernels, trainable scale factors, trainable shift factors), or can comprise any suitable activation functions (e.g., sigmoid functions, softmax functions, hyperbolic tangent functions, rectified linear unit functions). Non-limiting examples of the base neuronal dynamics 212 can be perceptron dynamics, SNU dynamics, LSTM dynamics, or any suitable combination thereof.

In various aspects, during processing of the one or more input vectors 202, the base neuronal dynamics 212 can be considered as computing or calculating a set of operands 214. In various instances, the set of operands 214 can comprise $p_j$ operands, for any suitable positive integer $p_j$; an operand 214(1) to an operand 214($p_j$). In various cases, each of the set of operands 214 can be any suitable scalar, vector, matrix, or tensor that the base neuronal dynamics 212 can compute or calculate by applying a respective trainable parameter, a respective mathematical operator, or a respective activation function either to the one or more input vectors 202 or to a previous one of the set of operands 214. As a non-limiting example, the operand 214(1) can be considered as a first or initial operand created by the base neuronal dynamics 212. That is, the base neuronal dynamics 212 can apply a first trainable parameter, mathematical operator, or activation function to the one or more input vectors 202, and the computational result of such application can be the operand 214(1). As another non-limiting example, the base neuronal dynamics 212 can apply a second trainable parameter, mathematical operator, or activation function to the operand 214(1), and the computational result of such application can be an operand 214(2) (not shown). Continuing in this fashion, and as even another non-limiting example, the base neuronal dynamics 212 can apply a $p_j$-th trainable parameter, mathematical operator, or activation function to an operand 214($p_j-1$) (not shown), and the computational result of such application can be the operand 214($p_j$), which can be the last or final operand computed by the base neuronal dynamics 212. In some cases, the operand 214($p_j$) (e.g., the last or final operand computed by the base neuronal dynamics 212) can be equal to the output vector 216. Note that, in some aspects, two or more of the set of operands 214 can be computed simultaneously or otherwise in parallel with each other by the base neuronal dynamics 212. In various instances, each of the set of operands 214 can be considered as representing a respective stepping stone along the processing journey from the one or more input vectors 202 to the output vector 216.

Now, as mentioned above, the base neuron population 108($j$) can supply the output vector 216 as input to subsequent (or, in some cases, previous) ones of the set of base neuron populations 108. For this reason, the output vector 216, and thus the base neuron population 108($j$), can be considered as directly contributing to the inferencing task result 106. In stark contrast, the control neuron population 110 can, in various aspects, refrain from supplying the output vector 210 as input to subsequent (or previous) ones of the set of base neuron populations 108. Instead, the control neuron population 110 can supply the output vector 210 to the base neuron population 108($j$) as a modulatory input rather than as a traditional input.

Indeed, as shown, the output vector 210 can be considered as being distinct from, as not being part of, or as otherwise not being appended to the one or more input vectors 202. Accordingly, the output vector 210 can be not processed by the base neuronal dynamics 212 in the same way as the one or more input vectors 202 are processed. Instead, the output vector 210 can be processed by modulatory neuronal dynamics 218 of the base neuron population 108($j$), and such processing can involve multiplicatively scaling any of the set of operands 214 based on the output vector 210.

In various aspects, the modulatory neuronal dynamics 218 can be or otherwise comprise any suitable mathematical tools that are implementable or employable by the neurons of the base neuron population 108($j$) and that are distinct or separate from the base neuronal dynamics 212. Accordingly, the modulatory neuronal dynamics 218 can comprise any suitable mathematical operators (e.g., matrix multiplication operators, element-wise vector multiplication operators, dot-product operators, cross-product operators, vector addition operators), can comprise any suitable trainable parameters (e.g., trainable weight matrices, trainable bias vectors, trainable convolutional kernels, trainable scale factors, trainable shift factors), or can comprise any suitable activation functions (e.g., sigmoid functions, softmax functions, hyperbolic tangent functions, rectified linear unit functions). As a non-limiting example, the modulatory neuronal dynamics 218 can comprise a trainable weight matrix, a matrix multiplication operator that can be leveraged to multiply that trainable weight matrix by the output vector 210, a modulatory activation function that can be applied to the product produced by the matrix multiplication operator, and an element-wise vector multiplication operator that can multiply, in element-wise fashion, any of the set of operands 214 with whatever vector is produced by the modulatory activation function. Such operand can thus be considered as being modulated (e.g., multiplicatively scaled) based on the output vector 210.

As shown in FIG. 2, it can be the case that the operand 214($p_j$) is multiplicatively scaled based on the output vector 210. Because the operand 214($p_j$) can be the last or final operand computed by the base neuronal dynamics 212, such multiplicative scaling can be referred to as output-side neuronal activity modulation. In other words, if the operand 214($p_j$) were not multiplicatively scaled based on the output vector 210, the output vector 216 could be equal or equivalent to the operand 214($p_j$). However, in cases where the operand 214($p_j$) is multiplicatively scaled based on the output vector 210, the output vector 216 can instead be equal or equivalent to the scaled version of the operand 214($p_j$).

Now, consider FIG. 3. As shown, rather than being used to multiplicatively scale the operand 214($p_j$), the output vector 210 can instead be used to multiplicatively scale the operand 214(1). Because the operand 214(1) can be the first or initial operand computed by the base neuronal dynamics 212, such multiplicative scaling can be referred to as input-side neuronal activity modulation. Note that the value of any given operand in the set of operands 214 can depend upon the values of whichever of the set of operands 214 precede or are computed before that given operand. Accordingly, modulation (e.g., multiplicative scaling) of the operand 214(1) can indirectly affect values or magnitudes of any of the operand 214(2) to the operand 214($p_j$).

Next, consider FIG. 4. As shown, rather than being used to multiplicatively scale the operand 214($p_j$) or the operand 214(1), the output vector 210 can instead be used to multiplicatively scale any of the operand 214(2) to the operand 214($p_j-1$). Because the operand 214(2) to the operand 214($p_j-1$) can be computed intermediately by the base neuronal dynamics 212, such multiplicative scaling can be referred to as intermediate-side neuronal activity modulation. Again, the value of any given operand in the set of operands 214 can depend upon the values of whichever of the set of operands 214 precede or are computed before that given operand. Accordingly, if modulation (e.g., multiplicative scaling) is applied to an operand 214($x$) for any suitable positive integer $1<q<p_j$, such modulation can indirectly affect values or magnitudes of any of an operand 214($q+1$) to the operand 214($p_j$).

In any case, the output vector 210 can be considered as not just another traditional input to be processed by the base neuron population 108($j$). Indeed, if the output vector 210 were treated as just another traditional input, then the output vector 210 would be appended to, concatenated with, or otherwise treated as part of the one or more input vectors 202. In such case, the output vector 210 would be passed through the base neuronal dynamics 212 so as to directly contribute to computation of the output vector 216 (and thus of the inferencing task result 106). As shown in FIGS. 2-4, however, the output vector 210 can be not treated as just another part of the one or more input vectors 202, can be not passed through the base neuronal dynamics 212, and can accordingly be considered as not directly contributing to computation of the output vector 216 (and thus of the inferencing task result 106). Instead, the output vector 210 can be leveraged (e.g., by the modulatory neuronal dynamics 218) so as to modulate (e.g., multiplicatively scale up or down) any of the set of operands 214. Such modulation can certainly impact or influence the value or magnitude of the output vector 216 (and thus of the inferencing task result 106), but such impact or influence is indirect and thus plainly of a different kind than the type of impact or influence that the one or more input vectors 202 have.

To help clarify this distinction in type of impact or influence, consider the following illustrative analogy. The base neuronal dynamics 212 can be considered as being conceptually analogous to assembly line workers that directly build a product piece by piece with their own hands. In contrast, the control neuronal dynamics 206 can be considered as conceptually analogous to managers of those assembly line workers. The managers can themselves refrain from directly building the product piece by piece with their own hands. Yet, the managers can nevertheless significantly influence the product by altering the behaviors of or the tools or materials available to the assembly line workers. In an analogous way, the base neuronal dynamics 212 can be considered as playing a direct role in the computation of the output vector 216 (and thus of the inferencing task result 106), whereas the control neuronal dynamics 206 can instead be considered as playing an indirect role in the computation of the output vector 216 (and thus of the inferencing task result 106). In other words, the base neuron population 108($j$) can directly compute the output vector 216, but the control neuron population 110 can change the activity of the base neuron population 108($j$) by modulating (e.g., scaling) any of the set of operands 214.

Furthermore, note that such modulation can be facilitated, no matter the specific content or form of the control neuronal dynamics 206, and no matter the specific content or form of the base neuronal dynamics 212. In particular, no matter what specific trainable parameters, mathematical operators, or activation functions are implemented in the base neuronal dynamics 212, the base neuronal dynamics 212 can internally compute the set of operands 214. Moreover, no matter what specific trainable parameters, mathematical operators, or activation functions are implemented in the control neuronal dynamics 206, the control neuronal dynamics 206 can generate the output vector 210, and the output vector 210 can be leveraged to modulate (e.g., scale) any of the set of operands 214. Thus, in some cases, the control neuronal dynamics 206 can be different, non-uniform, or otherwise diverse from the base neuronal dynamics 212 (e.g., the control neuronal dynamics 206 can comprise perceptron dynamics, whereas the base neuronal dynamics 212 can comprise SNU dynamics). Moreover, in some instances, the control neuronal dynamics 206 can exhibit multiple different types of neuronal dynamics by itself (e.g., the control neuronal dynamics 206 can include both perceptron dynamics and SNU dynamics). Likewise, in some instances, the base neuronal dynamics 212 can exhibit multiple different types of neuronal dynamics by itself (e.g., the base neuronal dynamics 212 can include both SNU dynamics and LSTM dynamics). In this way, the control neuron population 110 and the base neuron population 108($j$) can exhibit neural diversity (e.g., different, diverse, or non-uniform neuronal dynamics).

Figure 5:
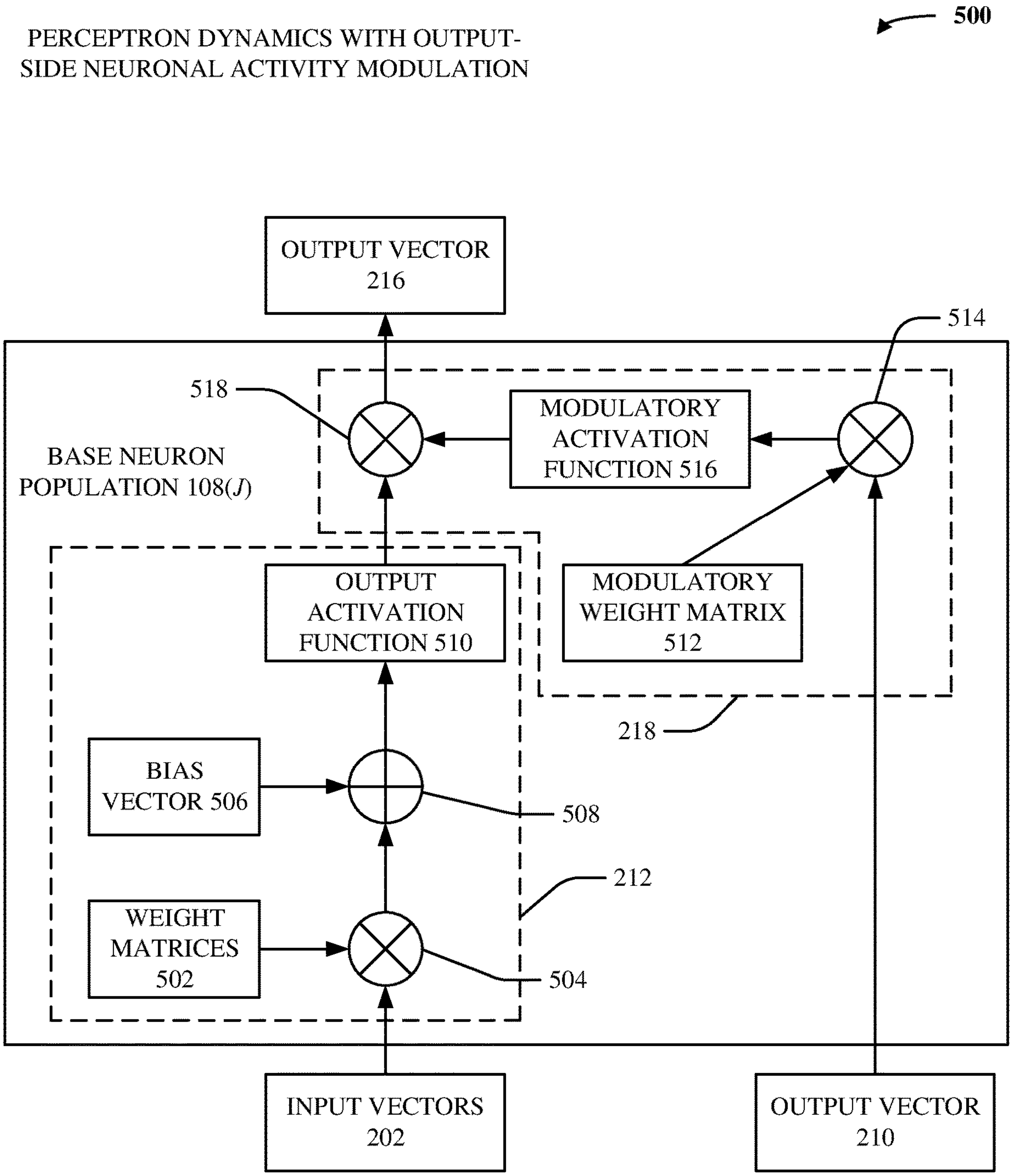
FIGS. 5-7 illustrate example, non-limiting block diagrams respectively showing how output-side, input-side, and intermediate-side neuronal activity modulation can be implemented for perceptron dynamics in accordance with one or more embodiments described herein.
Figure 6:
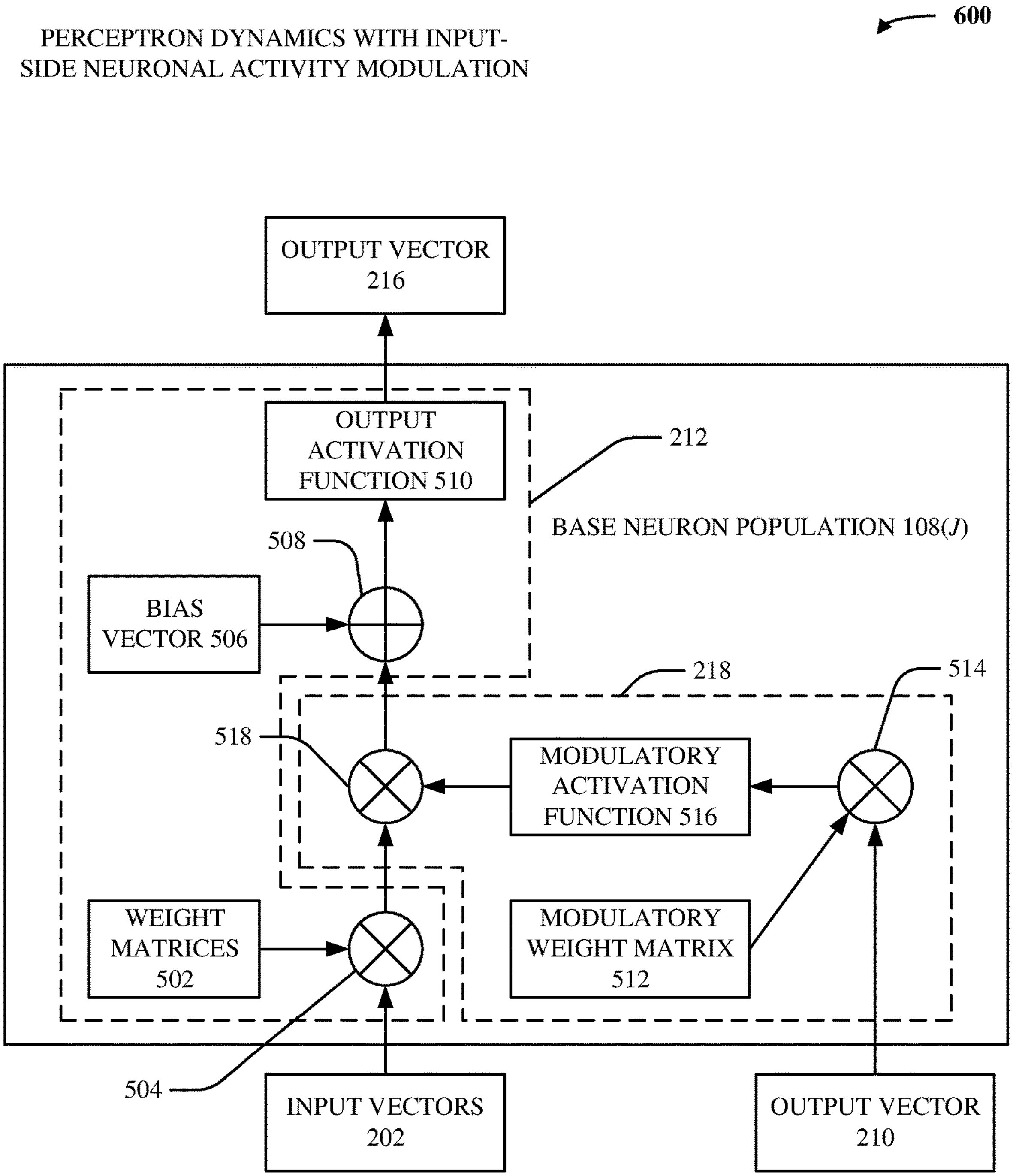
Figure 7:
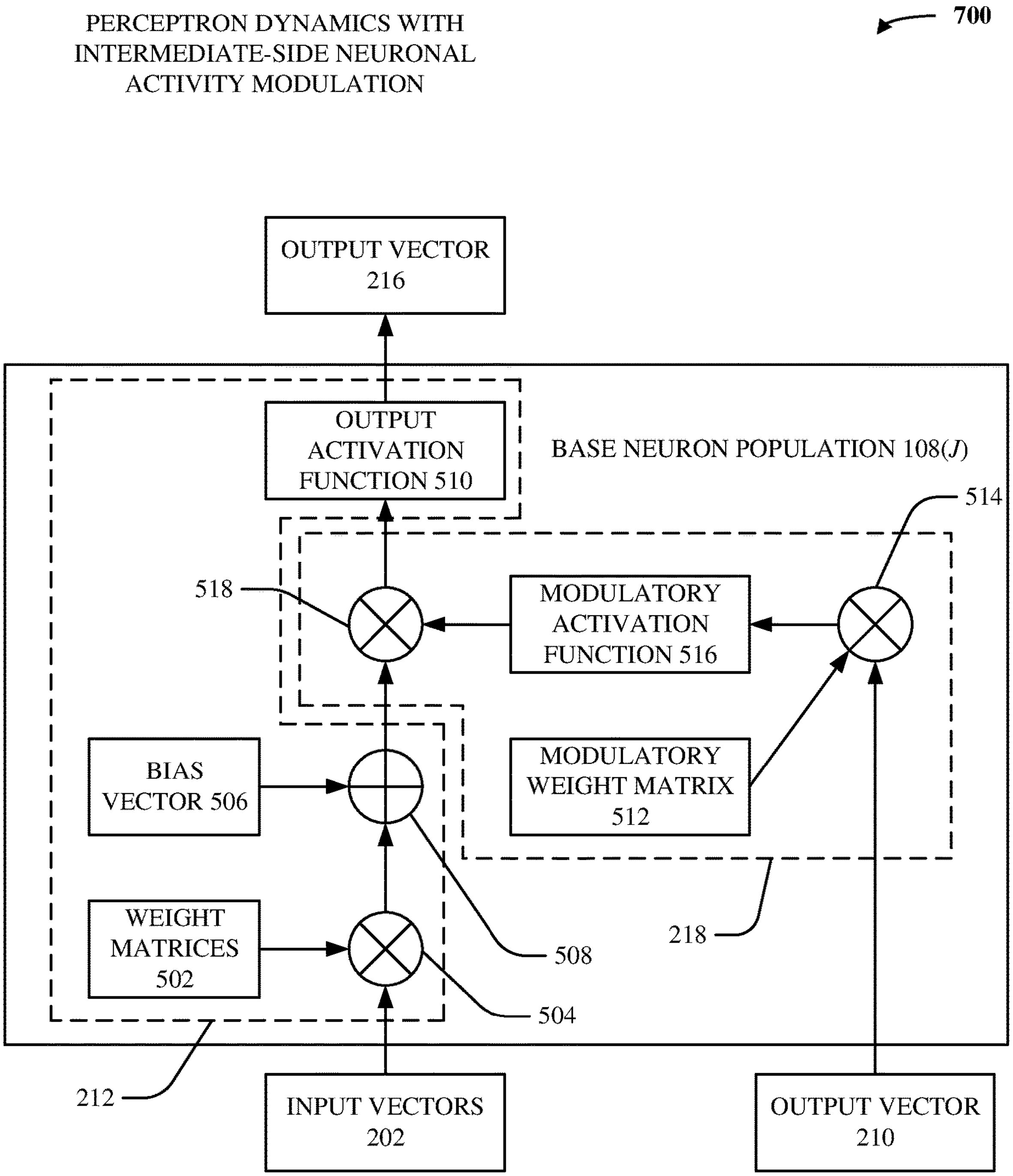

FIGS. 5-7 illustrate example, non-limiting block diagrams 500, 600, and 700 respectively showing how output-side, input-side, and intermediate-side neuronal activity modulation can be implemented for perceptron dynamics in accordance with one or more embodiments described herein. That is, FIGS. 5-7 can be considered as depicting non-limiting example embodiments in which the base neuronal dynamics 212 can be perceptron dynamics (e.g., in which the neurons of the base neuron population 108($j$) can be perceptrons).

First, consider FIG. 5. As shown, the base neuronal dynamics 212 can comprise one or more weight matrices 502, a matrix multiplication operator 504, a bias vector 506, a vector addition operator 508, and an output activation function 510.

In various embodiments, the one or more weight matrices 502 can be any suitable trainable weight matrices that respectively correspond (e.g., in one-to-one fashion) to the one or more input vectors 202. As a non-limiting example, the one or more input vectors 202 can include an input vector $x^t$ that has been provided at a time-step t by one or more others of the set of base neuron populations 108 (e.g., can be received via bottom-up or top-down connections), and the one or more input vectors 202 can also include an input vector $y^{t-1}$ which can be considered as the output produced by the base neuron population 108($j$) during a (t−1)-th time-step (e.g., can be received via recurrent connections). In such case, the one or more weight matrices 502 can include a trainable weight matrix W that can correspond to $x^t$ and a trainable weight matrix H that can correspond to $y^{t-1}$.

In various aspects, the matrix multiplication operator 504 can respectively multiply the one or more weight matrices 502 by the one or more input vectors 202 and (as appropriate) can sum such products together. As a non-limiting example, the result of the matrix multiplication operator 504 can be $Wx^t+Hy^{t-1}$. Note that $Wx^t+Hy^{t-1}$ can be considered as a first operand internally computed by the base neuronal dynamics 212. That is, $Wx^t+Hy^{t-1}$ can be considered as the operand 214(1).

In various instances, the bias vector 506 can be any suitable trainable bias vector, which can be represented as b. In various cases, the vector addition operator 508 can add the bias vector 506 to the result produced by the matrix multiplication operator 504. That is, the result produced by the vector addition operator 508 can be $Wx^t+Hy^{t-1}+b$. Note that $Wx^t+Hy^{t-1}+b$ can be considered as a second operand internally computed by the base neuronal dynamics 212. That is, $Wx^t+Hy^{t-1}+b$ can be considered as the operand 214(2).

In various aspects, the output activation function 510 can be any suitable activation function, such as sigmoid, softmax, hyperbolic tangent, or rectified linear unit. The output activation function 510 can be represented as $f$. In various cases, the output activation function 510 can be applied to the result produced by the vector addition operator 508. That is, the result produced by the output activation function 510 can be $f(Wx^t+Hy^{t-1}+b)$. Note that $f(Wx^t+Hy^{t-1}+b)$ can be considered as a third and final operand internally computed by the base neuronal dynamics 212. That is, $f(Wx^t+Hy^{t-1}+b)$ can be considered as the operand 214($p_j$) where $p_j=3$.

As shown, the modulatory neuronal dynamics 218 can comprise a modulatory weight matrix 512, a matrix multiplication operator 514, a modulatory activation function 516, and an element-wise vector multiplication operator 518.

In various aspects, the output vector 210, which can be provided by the control neuron population 110 at the time-step t, can be represented as $$y^t_{mod}.$$

In various instances, the modulatory weight matrix 512, which can be represented as $W_{mod}$, can be any suitable trainable weight matrix that can correspond to the output vector 210. In various cases, the matrix multiplication operator 514 can multiply the modulatory weight matrix 512 with the output vector 210. That is, the result produced by the matrix multiplication operator 514 can be $$W_{mod}y^t_{mod}.$$

In various aspects, the modulatory activation function 516 can be any suitable activation function, such as sigmoid, softmax, hyperbolic tangent, or rectified linear unit. In various instances, the modulatory activation function 516 can be represented as $f_{mod}$. In various cases, the modulatory activation function 516 can be applied to the result produced by the matrix multiplication operator 514. That is, the result produced by the modulatory activation function 516 can be $$f_{mod}(W_{mod}y^t_{mod}).$$

As shown in the non-limiting example of FIG. 5, the element-wise vector multiplication operator 518 can multiply, in element-wise fashion, the result produced by the modulatory activation function 516 with the result produced by the output activation function 510. That is, in the non-limiting example of FIG. 5, the result produced by the element-wise vector multiplication operator 518 can be $$f\left(Wx^t+Hy^{t-1}+b\right)\odot f_{mod}(W_{mod}y^t_{mod}),$$

which, in the non-limiting example of FIG. 5, can be treated as or otherwise considered as equal to the output vector 216, which can be denoted as $y_t$. That is, in the non-limiting example of FIG. 5, it can be the case that:

$$y^t=f\left(Wx^t+Hy^{t-1}+b\right)\odot f_{mod}(W_{mod}y^t_{mod}).$$

Note that, in the non-limiting example of FIG. 5, the base neuronal dynamics 212 can be considered as perceptron dynamics, and the modulatory neuronal dynamics 218 and the output vector 210 can be collectively considered as multiplicatively scaling the final operand internally computed by such perceptron dynamics. Accordingly, FIG. 5 can be considered as illustrating how output-side neuronal activity modulation can be applied to perceptron dynamics.

Now, consider FIG. 6. As mentioned above, the base neuronal dynamics 212 can be considered as perceptron dynamics. However, rather than modulating the final operand produced by such perceptron dynamics, the modulatory neuronal dynamics 218 and the output vector 210 can instead be collectively considered as multiplicatively scaling the first or initial operand internally computed by such perceptron dynamics. In other words, the element-wise vector multiplication operator 518 can be applied immediately downstream of the matrix multiplication operator 504 instead of immediately downstream of the output activation function 510. In such case, the output vector 216 can be given by:

$$y^t = f\left(\left(Wx^t + Hy^{t-1}\right) \odot f_{mod}(W_{mod}y^t_{mod}) + b\right)$$

Note that, in the non-limiting example of FIG. 6, the base neuronal dynamics 212 can be considered as perceptron dynamics, and the modulatory neuronal dynamics 218 and the output vector 210 can be collectively considered as multiplicatively scaling the first or initial operand internally computed by such perceptron dynamics. Accordingly, FIG. 6 can be considered as illustrating how input-side neuronal activity modulation can be applied to perceptron dynamics.

Now, consider FIG. 7. As mentioned above, the base neuronal dynamics 212 can be considered as perceptron dynamics. However, rather than modulating the final operand or the initial operand produced by such perceptron dynamics, the modulatory neuronal dynamics 218 and the output vector 210 can instead be collectively considered as multiplicatively scaling an intermediate operand internally computed by such perceptron dynamics. For instance, the element-wise vector multiplication operator 518 can be applied immediately downstream of the vector addition operator 508 instead of immediately downstream of the output activation function 510 and instead of immediately downstream of the matrix multiplication operator 504. In such case, the output vector 216 can be given by:

$$y^t = f\left(\left(Wx^t + Hy^{t-1} + b\right) \odot f_{mod}(W_{mod}y^t_{mod})\right)$$

Note that, in the non-limiting example of FIG. 7, the base neuronal dynamics 212 can be considered as perceptron dynamics, and the modulatory neuronal dynamics 218 and the output vector 210 can be collectively considered as multiplicatively scaling an intermediate operand internally computed by such perceptron dynamics. Accordingly, FIG. 7 can be considered as illustrating how intermediate-side neuronal activity modulation can be applied to perceptron dynamics.

Figure 8:
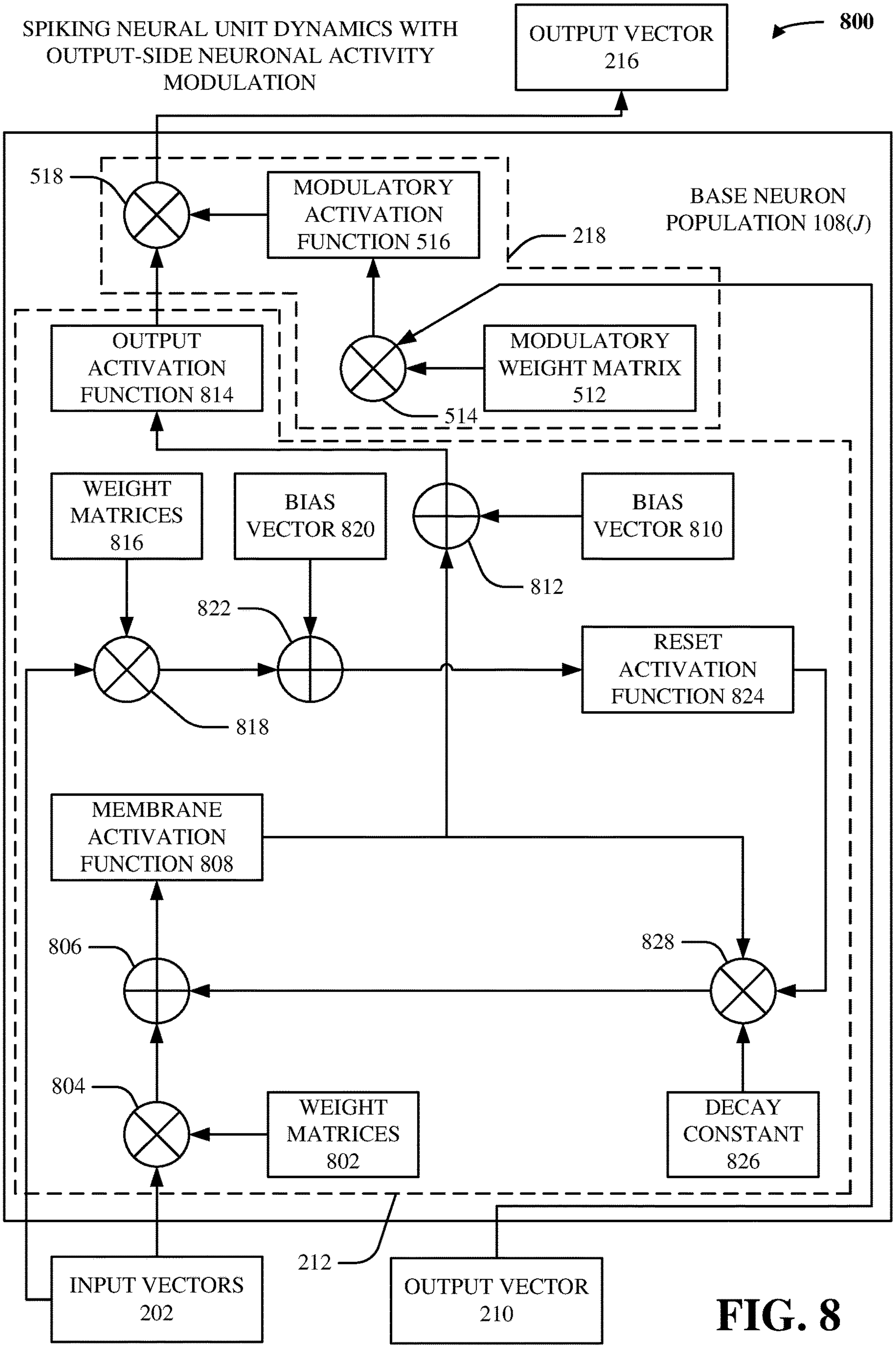
FIGS. 8-10 illustrate example, non-limiting block diagrams respectively showing how output-side, input-side, and intermediate-side neuronal activity modulation can be implemented for spiking neural unit dynamics in accordance with one or more embodiments described herein.
Figure 9:
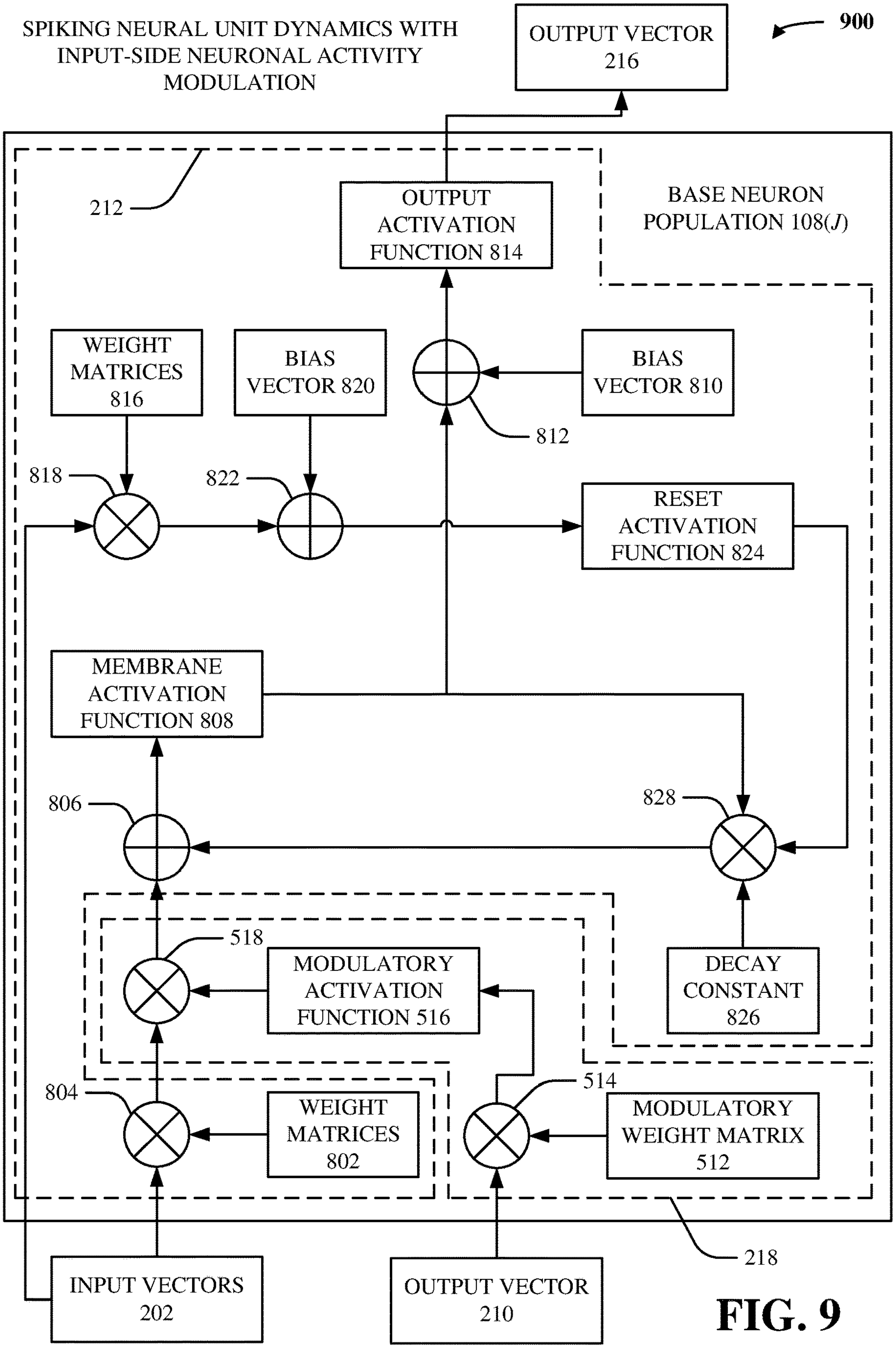
Figure 10:
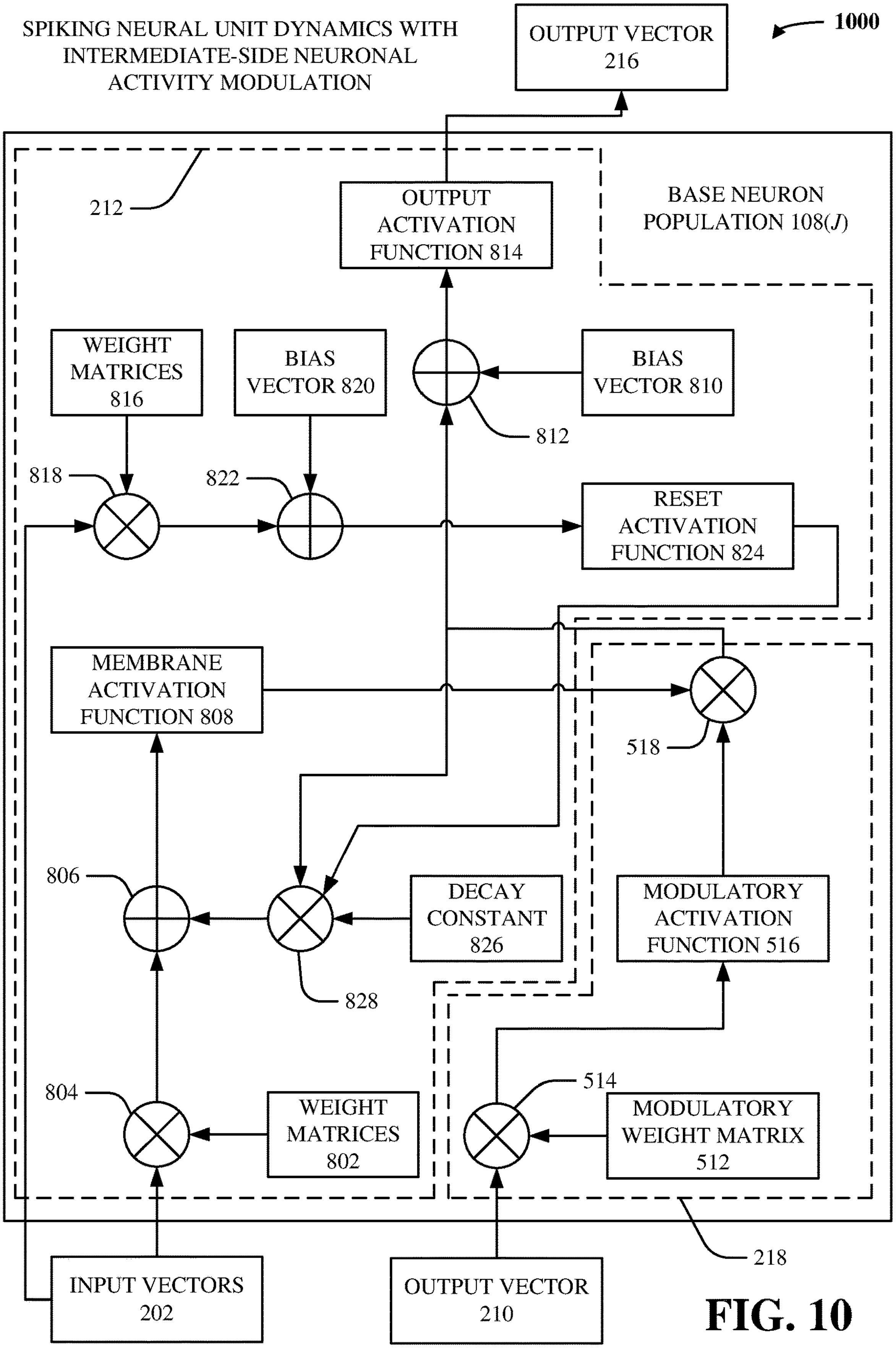

FIGS. 8-10 illustrate example, non-limiting block diagrams 800, 900, and 1000 respectively showing how output-side, input-side, and intermediate-side neuronal activity modulation can be implemented for SNU dynamics in accordance with one or more embodiments described herein. That is, FIGS. 8-10 can be considered as depicting non-limiting example embodiments in which the base neuronal dynamics 212 can be SNU dynamics (e.g., in which the neurons of the base neuron population 108(*j*) can be SNUs).

First, consider FIG. 8. As shown, the base neuronal dynamics 212 can comprise one or more weight matrices 802, a matrix multiplication operator 804, a vector addition operator 806, a membrane activation function 808, a bias vector 810, a vector addition operator 812, an output activation function 814, one or more weight matrices 816, a matrix multiplication operator 818, a bias vector 820, a vector addition operator 822, a reset activation function 824, a decay constant 826, and an element-wise vector multiplication operator 828.

In various embodiments, the one or more weight matrices 802 can be any suitable trainable weight matrices that respectively correspond (e.g., in one-to-one fashion) to the one or more input vectors 202. As mentioned above, the one or more input vectors 202 can include an input vector $x^t$ that has been provided at a time-step t by one or more others of the set of base neuron populations 108 (e.g., can be received via bottom-up or top-down connections), and the one or more input vectors 202 can also include an input vector $y^{t-1}$ which can be considered as the output produced by the base neuron population 108(*j*) during a (t−1)-th time-step (e.g., can be received via recurrent connections). Accordingly, the one or more weight matrices 802 can include a trainable weight matrix W that can correspond to $x^t$ and a trainable weight matrix H that can correspond to $y^{t-1}$.

In various aspects, the matrix multiplication operator 804 can respectively multiply, at the time-step t, the one or more weight matrices 802 by the one or more input vectors 202 and (as appropriate) can sum such products together. As a non-limiting example, the result of the matrix multiplication operator 804 at the time-step t can be $Wx^t+Hy^{t-1}$. Note that $Wx^t+Hy^{t-1}$ can be considered as a first or initial operand internally computed by the base neuronal dynamics 212 at the time-step t. That is, $Wx^t+Hy^{t-1}$ can be considered as the operand 214(1).

In various instances, as shown, the vector addition operator 806 can add, at the time-step t, the result produced by matrix multiplication operator 804 at the time-step t to whatever result is produced by the element-wise vector multiplication operator 828 at the time-step t. For now, let $q^t$ denote whatever result is produced by the element-wise vector multiplication operator 828 at the time-step t. Accordingly, the result produced by the vector addition operator 806 at the time-step t can be $Wx^t+Hy^{t-1}+q^t$. Note that $Wx^t+Hy^{t-1}+q^t$ can be considered as another operand internally computed by the base neuronal dynamics 212.

In various cases, the membrane activation function 808 can be any suitable activation function, such as sigmoid, softmax, hyperbolic tangent, or rectified linear unit. The membrane activation function 808 can be represented as $f_{mem}$. In various aspects, the membrane activation function 808 can be applied to the result produced by the vector addition operator 806 at the time-step t. That is, the result produced by the membrane activation function 808 at the time-step t can be $f_{mem}(Wx^t+Hy^{t-1}+q^t)$. Note that $f_{mem}(Wx^t+Hy^{t-1}+q^t)$ can be considered as a yet another operand internally computed by the base neuronal dynamics 212. In various cases, $f_{mem}(Wx^t+Hy^{t-1}+q^t)$ can be denoted as $s^t$, which can be considered as an internal membrane state of the base neuron population 108(*j*) produced at the time-step t. That is, in the non-limiting example of FIG. 8, $s^t=f_{mem}(Wx^t+Hy^{t-1}+q^t)$.

Now, in various instances, the one or more weight matrices 816 can be any suitable trainable weight matrices that respectively correspond (e.g., in one-to-one fashion) to the one or more input vectors 202. Accordingly, the one or more weight matrices 816 can include a trainable weight matrix $W_r$ that can correspond to $x^t$ and a trainable weight matrix $H_r$ that can correspond to $y^{t-1}$.

In various aspects, the matrix multiplication operator 818 can respectively multiply, at the time-step t, the one or more weight matrices 816 by the one or more input vectors 202 and (as appropriate) can sum such products together. As a non-limiting example, the result of the matrix multiplication operator 818 at the time-step t can be $W_r x^t + H_r y^{t-1}$. Note that $W_r x^t + H_r y^{t-1}$ can be considered as a still another operand internally computed by the base neuronal dynamics 212.

In various instances, the bias vector 820 can be any suitable trainable bias vector, which can be represented as $b_r$. In various cases, the vector addition operator 822 can add the bias vector 820 to the result produced by the matrix multiplication operator 818 at the time-step t. That is, the result produced by the vector addition operator 822 at the time-step t can be $W_r x^t + H_r y^{t-1} + b_r$. Note that $W_r x^t + H_r y^{t-1} + b_r$ can be considered as even another operand internally computed by the base neuronal dynamics 212. For ease of explanation, let $W_r x^t + H_r y^{t-1} + b_r$ be denoted by $r^t$. That is, $r^t = W_r x^t + H_r y^{t-1} + b_r$.

In various aspects, the reset activation function 824 can be any suitable activation function, such as sigmoid, softmax, hyperbolic tangent, rectified linear unit, or a one-minus function. The reset activation function 824 can be represented as $f_r$. In various cases, the reset activation function 824 can be applied to the result produced by the vector addition operator 822 at the time-step t. That is, the result produced by the reset activation function 824 at the time-step t can be $f_r(r^t)$. Note that $f_r(r^t)$ can be considered as a yet another operand internally computed by the base neuronal dynamics 212.

In various instances, the decay constant 826 can be any suitable scalar, which can be denoted as d. In various cases, the element-wise vector multiplication operator 828 can multiply, in element-wise fashion, the result produced by the reset activation function 824 at the time-step t with whatever result was produced by the membrane activation function 808 at the (t−1)-th time-step, and can further multiply that product by the decay constant 826. Consistent with the above notation, whatever result was produced by the membrane activation function 808 at the (t−1)-th time-step can be considered as the immediately previous internal membrane state of the base neuron population 108(*j*) and can be denoted as $s^{t-1}$. So, the result produced by the element-wise vector multiplication operator 828 at the time-step t, which as mentioned above can be denoted as $q^t$, can be $df_r(r^t) \odot s^{t-1}$. Note that $q^t = df_r(r^t) \odot s^{t-1}$ can be considered as still another operand internally produced by the base neuronal dynamics 212.

Accordingly, in the non-limiting example of FIG. 8, it can be the case that:

$$s^t = f_{mem}\left(Wx^t + Hy^{t-1} + dr_r(r^t) \odot s^{t-1}\right)$$

Now, in various aspects, the bias vector 810 can be any suitable trainable bias vector, which can be represented as b. In various cases, the vector addition operator 812 can add the bias vector 810 to the result produced by the membrane activation function 808 at the time-step t. That is, the result produced by the vector addition operator 812 at the time-step t can be $s^t + b$. Note that $s^t + b$ can be considered as even another operand internally computed by the base neuronal dynamics 212.

In various instances, the output activation function 814 can be any suitable activation function, such as sigmoid, softmax, hyperbolic tangent, or rectified linear unit. The output activation function 814 can be represented as $f$. In various cases, the output activation function 814 can be applied to the result produced by the vector addition operator 812 at the time-step t. That is, the result produced by the output activation function 814 at the time-step t can be $f(s^t + b)$.

Note that $f(s^t + b)$ can be considered as a last or final operand internally computed by the base neuronal dynamics 212. That is, $f(s^t + b)$ can be considered as the operand 214($p_j$).

In various aspects, the modulatory neuronal dynamics 218 can comprise the modulatory weight matrix 512, the matrix multiplication operator 514, the modulatory activation function 516, and the element-wise vector multiplication operator 518, as described above.

As shown, in the non-limiting example of FIG. 8, the element-wise vector multiplication operator 518 can be positioned immediately downstream of the output activation function 814. Thus, the output vector 216, which can be denoted as $y_t$, can be equal to the result produced by the element-wise vector multiplication operator 518 at the time-step t, and such result can be given by:

$$y^t = f(s^t + b) \odot f_{mod}(W_{mod} y^t_{mod})$$

Note that, in the non-limiting example of FIG. 8, the base neuronal dynamics 212 can be considered as spiking neuronal unit dynamics, and the modulatory neuronal dynamics 218 and the output vector 210 can be collectively considered as multiplicatively scaling the final or last operand internally computed by such SNU dynamics. Accordingly, FIG. 8 can be considered as illustrating how output-side neuronal activity modulation can be applied to SNU dynamics.

Now, consider FIG. 9. As mentioned above, the base neuronal dynamics 212 can be considered as SNU dynamics. However, rather than modulating the last or final operand produced by such SNU dynamics, the modulatory neuronal dynamics 218 and the output vector 210 can instead be collectively considered as multiplicatively scaling the first or initial operand internally computed by such SNU dynamics. In other words, the element-wise vector multiplication operator 518 can be applied immediately downstream of the matrix multiplication operator 804 instead of immediately downstream of the output activation function 814. In such case, the output vector 216 can instead be given by $$y^t = f(s^t + b)$$

and $s^t$ can instead be given by $$s^t = f_{mem}\left(\left(Wx^t + Hy^{t-1}\right) \odot f_{mod}(W_{mod} y^t_{mod}) + df_r(r^t) \odot s^{t-1}\right)$$

Note that, in the non-limiting example of FIG. 9, the base neuronal dynamics 212 can be considered as SNU dynamics, and the modulatory neuronal dynamics 218 and the output vector 210 can be collectively considered as multiplicatively scaling the first or initial operand internally computed by such SNU dynamics. Accordingly, FIG. 9 can be considered as illustrating how input-side neuronal activity modulation can be applied to SNU dynamics.

Now, consider FIG. 10. As mentioned above, the base neuronal dynamics 212 can be considered as SNU dynamics. However, rather than modulating the final operand or the initial operand produced by such SNU dynamics, the modulatory neuronal dynamics 218 and the output vector 210 can instead be collectively considered as multiplicatively scaling any intermediate operand internally computed by such SNU dynamics. In the non-limiting example of FIG. 10, the element-wise vector multiplication operator 518 can be applied immediately downstream of the membrane activation function 808 instead of immediately downstream of the output activation function 814 and instead of immediately downstream of the matrix multiplication operator 804. In such case, the output vector 216 can be given by:

$$y^t = f(s^t + b)$$

but $s^t$ can instead be given by $$s^t = f_{mem}\left(Wx^t + Hy^{t-1} + df_r(r^t) \odot s^{t-1}\right) \odot f_{mod}(W_{mod} y^t_{mod})$$

Note that, in the non-limiting example of FIG. 10, the base neuronal dynamics 212 can be considered as SNU dynamics, and the modulatory neuronal dynamics 218 and the output vector 210 can be collectively considered as multiplicatively scaling an intermediate operand internally computed by such SNU dynamics. Accordingly, FIG. 10 can be considered as illustrating how intermediate-side neuronal activity modulation can be applied to SNU dynamics. However, FIG. 10 is a mere non-limiting example. In various embodiments, the element-wise vector multiplication operator 518 can instead be implemented immediately downstream of any other operator (e.g., 806, 818, 822, 812, 828) or function (e.g., 824) of the base neuronal dynamics 212.

FIGS. 5-10 are mere non-limiting examples showing how internally computed operands of perceptron dynamics or of SNU dynamics can be modulated in various cases. It is to be understood that modulation can be applied regardless of the specific content of the base neuronal dynamics 212 and regardless of the specific content of the control neuronal dynamics 206. Indeed, no matter what trainable parameters, mathematical operators, or activation functions are implemented within the base neuronal dynamics 212 and within the control neuronal dynamics 206, the base neuronal dynamics 212 can internally compute the set of operands 214, and the output vector 210 produced by the control neuronal dynamics 206 can be leveraged to modulate (e.g., multiplicatively scale) any of those operands.

Figure 11:
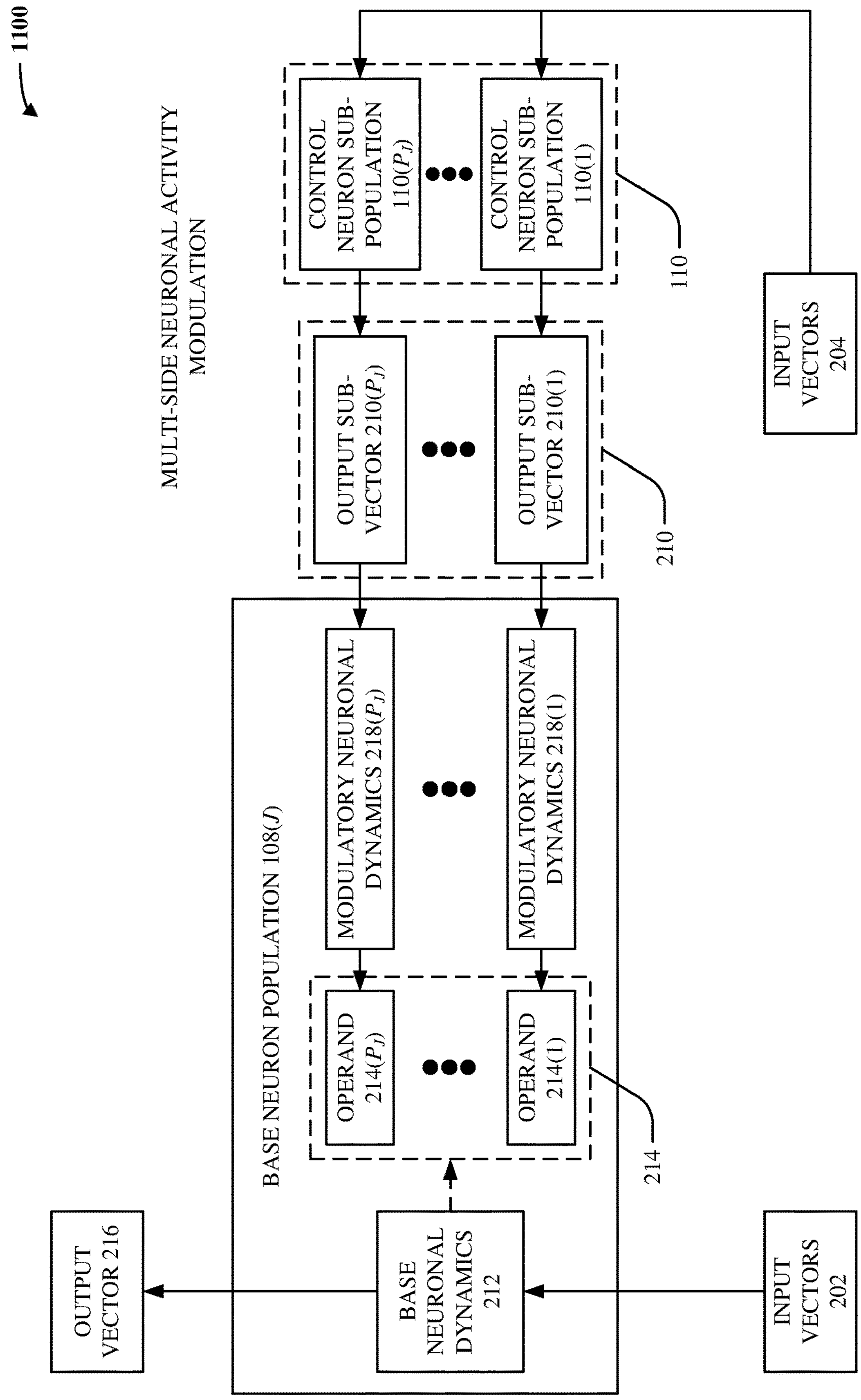
FIG. 11 illustrates an example, non-limiting block diagram showing how multi-side neuronal activity modulation can be facilitated for artificial neural networks in accordance with one or more embodiments described herein.

FIG. 11 illustrates an example, non-limiting block diagram 1100 showing how multi-side neuronal activity modulation can be facilitated for artificial neural networks in accordance with one or more embodiments described herein.

As shown, the one or more input vectors 202, the one or more input vectors 204, the base neuronal dynamics 212, the set of operands 214, and the output vector 216 can be as described above.

In various embodiments, the neurons of the control neuron population 110 can be considered as being divided up into any suitable number of sub-populations. As a non-limiting example, the control neuron population 110 can be considered as comprising $p_j$ sub-populations: a control neuron sub-population 110(1) to a control neuron sub-population 110($p_j$). In various aspects, each of such sub-populations can process the one or more input vectors 204 via its own respective neuronal dynamics (e.g., via its own instance of 206). Note that different sub-populations of the control neuron population 110 can have the same or different neuronal dynamics (e.g., the same or different trainable parameters, operators, or functions) as each other. Accordingly, the output vector 210 can thus be considered as comprising a total of $p_j$ sub-vectors, each of which can be produced by a respective sub-population of the control neuron population 110. As a non-limiting example, the control neuron sub-population 110(1) can generate an output sub-vector 210(1) based on the one or more input vectors 204. As another non-limiting example, the control neuron sub-population 110($p_j$) can generate an output sub-vector 210($p_j$) based on the one or more input vectors 204. Note that such sub-vectors can be different from or otherwise not equivalent to each other.

In various aspects, as shown, each of these sub-vectors can be processed by a respective instance or version of the modulatory neuronal dynamics 218, so as to modulate a respective one of the set of operands 214. As a non-limiting example, the output sub-vector 210(1) can be processed by modulatory neuronal dynamics 218(1), and such processing can be used to multiplicatively scale the operand 214(1). As another non-limiting example, the output sub-vector 210($p_j$) can be processed by modulatory neuronal dynamics 218($p_j$), and such processing can be used to multiplicatively scale the operand 214($p_j$). Note that the $p_j$ instances of the modulatory neuronal dynamics 218 can be different from or otherwise not equivalent to each other (e.g., can have different modulatory weight matrices or different modulatory activation functions). In this way, each of the set of operands 214 can be considered as being independently modulated by the control neuron population 110. However, this is a mere non-limiting example. In various instances, fewer than all of the set of operands 214 can be independently modulated by the control neuron population 110. Indeed, the control neuron population 110 can instead comprise z sub-populations, for any suitable positive integer $1<z<p_j$. In such case, those z sub-populations can respectively generate z output sub-vectors, and those z output sub-vectors can be used to independently modulate any z of the set of operands 214.

Because multiple of the set of operands 214 can be modulated in the non-limiting examples illustrated in FIG. 11, such modulation can be considered or otherwise referred to as multi-side neuronal activity modulation.

Figure 12:
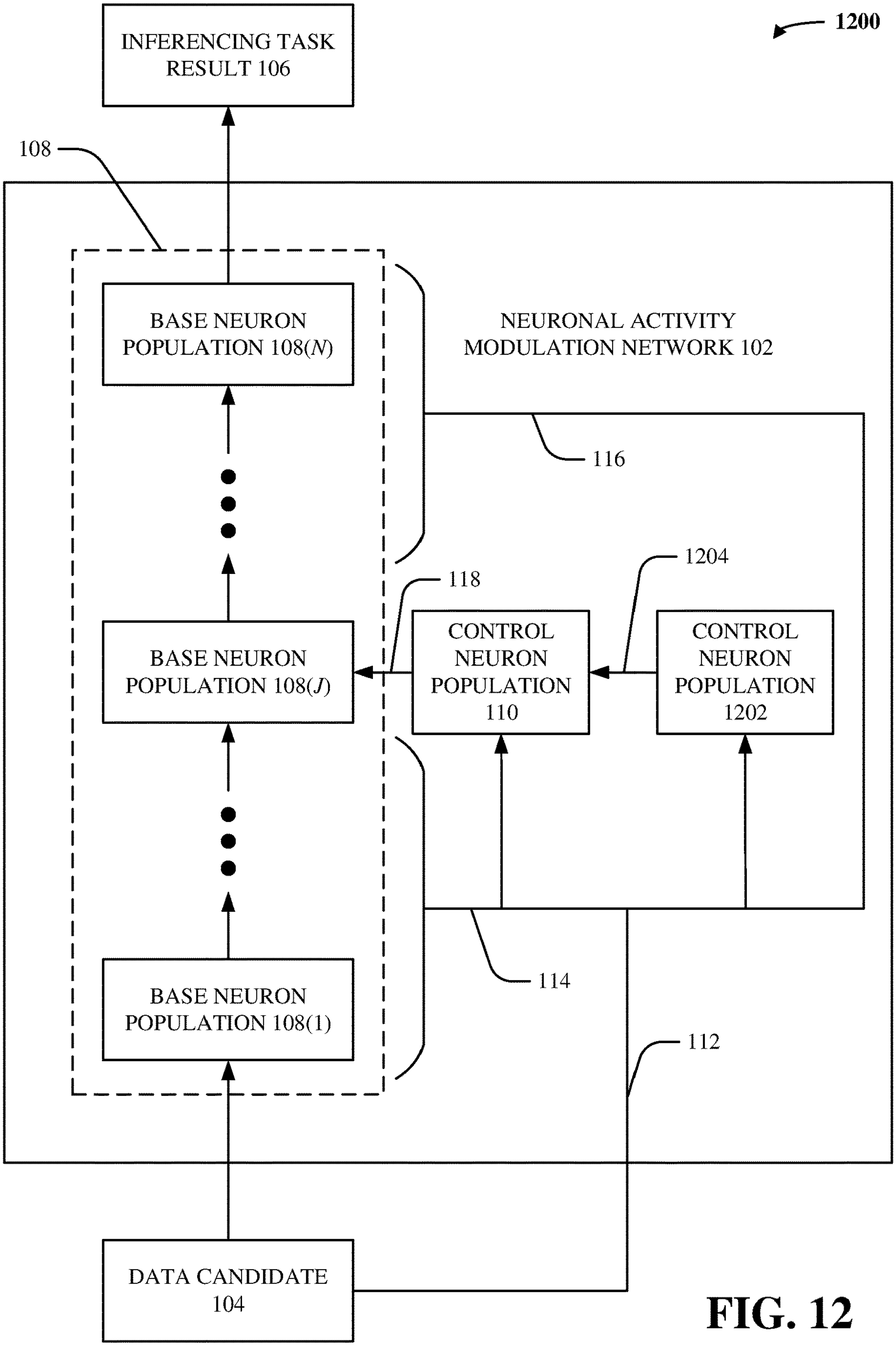
FIG. 12 illustrates an example, non-limiting block diagram showing how nested neuronal activity modulation can be facilitated for artificial neural networks in accordance with one or more embodiments described herein.

FIG. 12 illustrates an example, non-limiting block diagram 1200 showing how nested neuronal activity modulation can be facilitated for artificial neural networks in accordance with one or more embodiments described herein.

As shown, the neuronal activity modulation network 102 can comprise a control neuron population 1202 that can be in parallel with the control neuron population 110. As described thoroughly above, the control neuron population 110 can modulate the behavior of the base neuron population 108($j$) by multiplicatively scaling operands (e.g., 214) internally computed by the base neuron population 108($j$). In analogous fashion, the control neuron population 1202 can modulate the behavior of the control neuron population 110, as shown by numeral 1204, by multiplicatively scaling operands (e.g., 208) internally computed by the control neuron population 110. Note that the control neuron population 1202 can, in some cases, receive the same inputs (e.g., 204) as the control neuron population 110 or can, in other cases, receive different inputs (e.g., via any of 112, 114, or 116). In any case, control neuron populations can be nested or chained together so as to modulate each other's activities.

Figure 13:
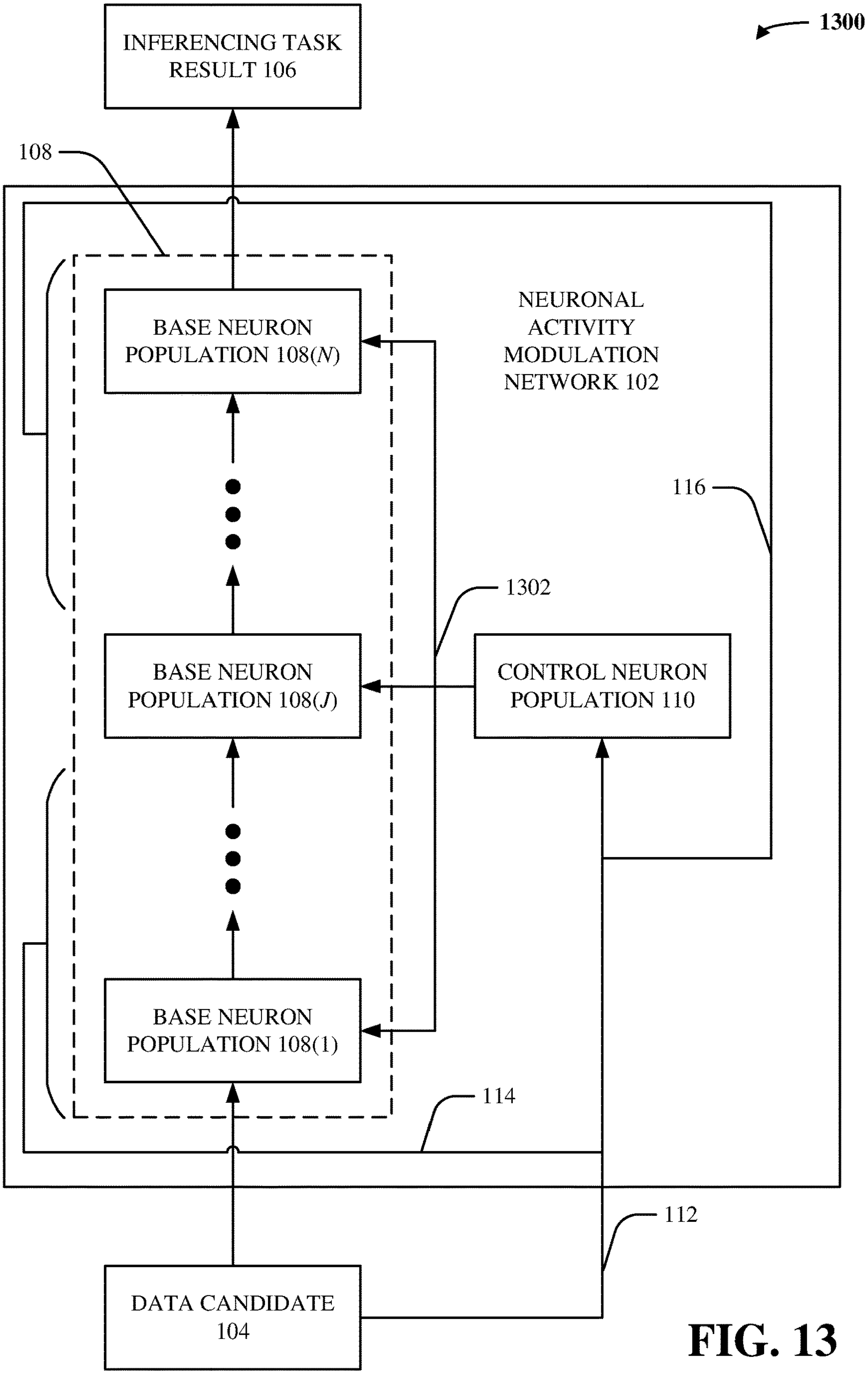
FIG. 13 illustrates an example, non-limiting block diagram showing how global neuronal activity modulation can be facilitated for artificial neural networks in accordance with one or more embodiments described herein.

FIG. 13 illustrates an example, non-limiting block diagram 1300 showing how global neuronal activity modulation can be facilitated for artificial neural networks in accordance with one or more embodiments described herein.

As shown, rather than merely modulating the activity of the base neuron population 108(*j*), the control neuron population 110 can, in various embodiments, modulate the activities of any or all of the set of base neuron populations 108, as shown via numeral 1302. Such modulations can be facilitated as described above (e.g., in accordance with FIGS. 2-10). Alternatively, there can be a separate, unique, or distinct instance (not shown) of the control neuron population 110 for each (or, in some instances, fewer than each) of the set of base neuron populations 108. In any case, it can be possible for more than one of the set of base neuron populations 108 to be modulated.

Note that any suitable training paradigm (e.g., supervised training, unsupervised training, reinforcement learning) can be implemented to train the neuronal activity modulation network 102. Regardless of which specific training paradigm is implemented, the trainable parameters of the set of base neuron populations 108 (e.g., the parameters in 212 and 218) and of the control neuron population 110 (e.g., the parameters in 206) can be initialized in any suitable fashion (e.g., via random initialization) and can be incrementally updated during training via backpropagation (e.g., stochastic gradient descent). Note that, in such cases, the control neuron population 110 can be considered as learning how to modulate or control the base neuron population 108(*j*), and the base neuron population 108(*j*) can conversely be considered as learning how to be modulated or controlled by the control neuron population 110.

Although the herein disclosure mainly describes embodiments in which neuronal activity modulation is accomplished via multiplicative scaling (e.g., in which the element-wise vector multiplication operator 518 is implemented), this is a mere non-limiting example. In various aspects, any other suitable mathematical operations can be used to facilitate neuronal activity modulation (e.g., the element-wise vector multiplication operator 518 can be replaced with any other suitable type of mathematical operator). As a non-limiting example, the element-wise vector multiplication operator 518 can be replaced with a vector addition operator, so as to facilitate additive scaling instead of multiplicative scaling.

Although the herein disclosure mainly describes various embodiments in which outputs (e.g., 210) of the control neuron population 110 are treated as modulatory signals by the base neuron population 108(*j*) and are not fed as traditional inputs to subsequent ones of the set of base neuron populations 108, this is a mere non-limiting example. In various aspects, the outputs (e.g., 210) produced by the control neuron population 110 can be treated as modulatory signals by the base neuron population 108(*j*) and can also be fed as traditional inputs to subsequent (or even previous) ones of the set of base neuron populations 108. In such cases, the neurons of the control neuron population 110 can be considered as functioning like a pyramidal-interneuron hybrid.

To help demonstrate technical benefits of various embodiments described herein, the present inventors performed various experiments. In such experiments, the present inventors created a first model that utilized a recurrent neural network transducer (RNN-T) architecture. The present inventors also created a second model that utilized an RNN-T architecture having an encoder network in which LSTM cells were replaced with SNUs. Lastly, the present inventors created a third model that utilized an RNN-T architecture having an encoder network in which LSTM cells were replaced with SNUs, where each of such SNUs was subject to both output-side and input-side neuronal activity modulation as described herein. The control neurons facilitating such modulation were non-controlled SNUs.

The present inventors trained all three of those models to perform automated speech recognition. During validation, the first model, which had over 56 million internal parameters, achieved a word error rate (WER) of 12.7%; the second model, which had about 16 million internal parameters, achieved a word error rate (WER) of 25.8%; and the third model, which had under 40 million internal parameters, achieved a word error rate (WER) of 13.3%. As these results demonstrate, the third model (which implemented various embodiments described herein) was able to achieve comparable inferencing accuracy as the first model, but with a significantly smaller computational footprint (e.g., about 30% reduction in number of internal parameters). Although the second model had an even smaller computational footprint (e.g., about a 72% reduction in number of parameters), it achieved a significantly worse inferencing accuracy (e.g., more than twice the error rate). Thus, these results show that various embodiments described herein were able to significantly reduce computational footprint while essentially maintaining inferencing accuracy. This certainly constitutes a concrete and tangible technical improvement in the field of artificial neural networks.

FIG. 14 illustrates a flow diagram of an example, non-limiting computer-implemented method 1400 that can facilitate neuronal activity modulation of artificial neural networks in accordance with one or more embodiments described herein.

In various embodiments, act 1402 can include generating, by a set of base neuron populations (e.g., 108) of an artificial neural network (e.g., 102) and during an inferencing phase (e.g., after 102 has already been trained) or a training phase (e.g., while 102 is currently being trained) of the artificial neural network, an inferencing task result (e.g., 106) based on a data candidate (e.g., 104).

In various aspects, act 1404 can include modulating, by a control neuron population (e.g., 110) that is independent of the set of base neuron populations and during the inferencing phase or the training phase, neuronal activity of at least one base neuron population (e.g., 108(*j*)) of the set of base neuron populations.

Although not explicitly shown in FIG. 14, the modulating the neuronal activity of the at least one base neuron population can comprise scaling, by the control neuron population, one or more operands (e.g., 214) internally produced by the at least one base neuron population.

Although not explicitly shown in FIG. 14, the at least one base neuron population can receive inputs (e.g., 202) produced by one or more of the set of base neuron populations, and the control neuron population can receive those inputs or a subset of those inputs (e.g., 204 can be equal to 202, or 204 can be a subset of 202).

Although not explicitly shown in FIG. 14, the control neuron population can receive, via bottom-up skip connections (e.g., 112 or 114), inputs (e.g., 204) produced by one or more of the set of base neuron populations that are prior to the at least one base neuron population.

Although not explicitly shown in FIG. 14, the control neuron population can receive, via top-down skip connections (e.g., 116), inputs (e.g., 204) produced by one or more of the set of base neuron populations that are subsequent to the at least one base neuron population.

Although not explicitly shown in FIG. 14, the at least one base neuron population and the control neuron population can exhibit non-uniform types of neuronal dynamics. In some cases, the non-uniform types of neuronal dynamics can be selected from the group consisting of perceptron dynamics, spiking neural unit dynamics, and long short-term memory dynamics.

Note that various embodiments described herein can be implemented in recurrent architectures as well as in non-recurrent architectures. For instance, as mentioned above, the base neuron population 108(*j*) and the control neuron population 110 can be coupled to themselves with recurrent connections (e.g., so that they can receive as input not just outputs produced by preceding layers but also their own previous outputs produced during previous time-steps). In other cases, however, the base neuron population 108(*j*) and the control neuron population 110 can exclude recurrent connections (e.g., can refrain from receiving as input their own previous outputs produced during previous time-steps).

Various embodiments described herein pertain to improved architectures for artificial neural networks. In various aspects, such improved architectures are concretely implementable, in terms of software coding, via explicit constraint or definition of neuronal dynamics. That is, for each discrete neuron population that is desired (e.g., whether a base neuron population or a control neuron population), one or more respective lines of software code can be written so as to define the neuronal dynamics (e.g., the trainable parameters, the activation functions, the mathematical operators) of that discrete neuron population.

As a non-limiting example, consider a base neuron population (e.g., 108(*j*)) having an all-to-all connectivity and exhibiting perceptron dynamics. In various aspects, the base neuron population can be created by one or more first lines of software code that explicitly define: a non-recurrent-input trainable weight matrix (e.g., W, part of 502) for the base neuron population; a recurrent-input trainable weight matrix (e.g., H, part of 502) for the base neuron population; a trainable bias vector (e.g., b, denoted by 506) for the base neuron population; an activation function (e.g., denoted by 510) for the base neuron population; and various mathematical operators utilized by the base neuron population (e.g., 504, 508). Suppose, for purposes of illustration, that the base neuron population is configured to receive (e.g., from preceding or subsequent layers) a 10-element input vector, and suppose that the base neuron population comprises a total of 21 perceptrons. In such cases, the non-recurrent-input trainable weight matrix of the base neuron population would be of size 21-by-10 (e.g., rows-by-columns), the recurrent-input trainable weight matrix of the base neuron population would be of size 21-by-21, the trainable bias vector of the base neuron population would have 21 elements, and the internal operands (e.g., 214) computed by the base neuron population would be 21-element vectors.

Now, in various embodiments, consider a control neuron population having an all-to-all connectivity and exhibiting perceptron dynamics. Like above, the control neuron population can, in various aspects, be created by one or more second lines of software code that explicitly define: a non-recurrent-input trainable weight matrix for the control neuron population; a recurrent-input trainable weight matrix for the control neuron population; a trainable bias vector for the control neuron population; an activation function for the control neuron population; and various mathematical operators utilized by the control neuron population. Suppose, for purposes of illustration, that the control neuron population is configured to receive the same 10-element input vector as the base neuron population, and suppose that the control neuron population comprises a total of 16 perceptrons. In such cases, the non-recurrent-input trainable weight matrix of the control neuron population would be of size 16-by-10, the recurrent-input trainable weight matrix of the control neuron population would be of size 16-by-16, the trainable bias vector of the control neuron population would have 16 elements, and the internal operands computed by the control neuron population would be 16-element vectors.

Now, in various embodiments, the control neuron population can be made to modulate neuronal activity of the base neuron population, by one or more third lines of software code that explicitly define modulatory dynamics (e.g., 218) that relate the control neuron population to the base neuron population. For instance, those one or more third lines of software code can define: a trainable modulatory weight matrix (e.g., 512); a modulatory activation function (e.g., 516); and various mathematical operators (e.g., 514, 518) that are utilized by the modulatory dynamics. Because the base neuron population and the control neuron population respectively comprise 21 neurons and 16 neurons in this non-limiting example, the trainable modulatory weight matrix would be of size 21-by-16. Accordingly, the output produced by such modulatory dynamics would be a 21-element vector that could thus be used for element-wise scaling (e.g., multiplicative or additive) of any internal operands computed by the base neuron population.

Figure 15:
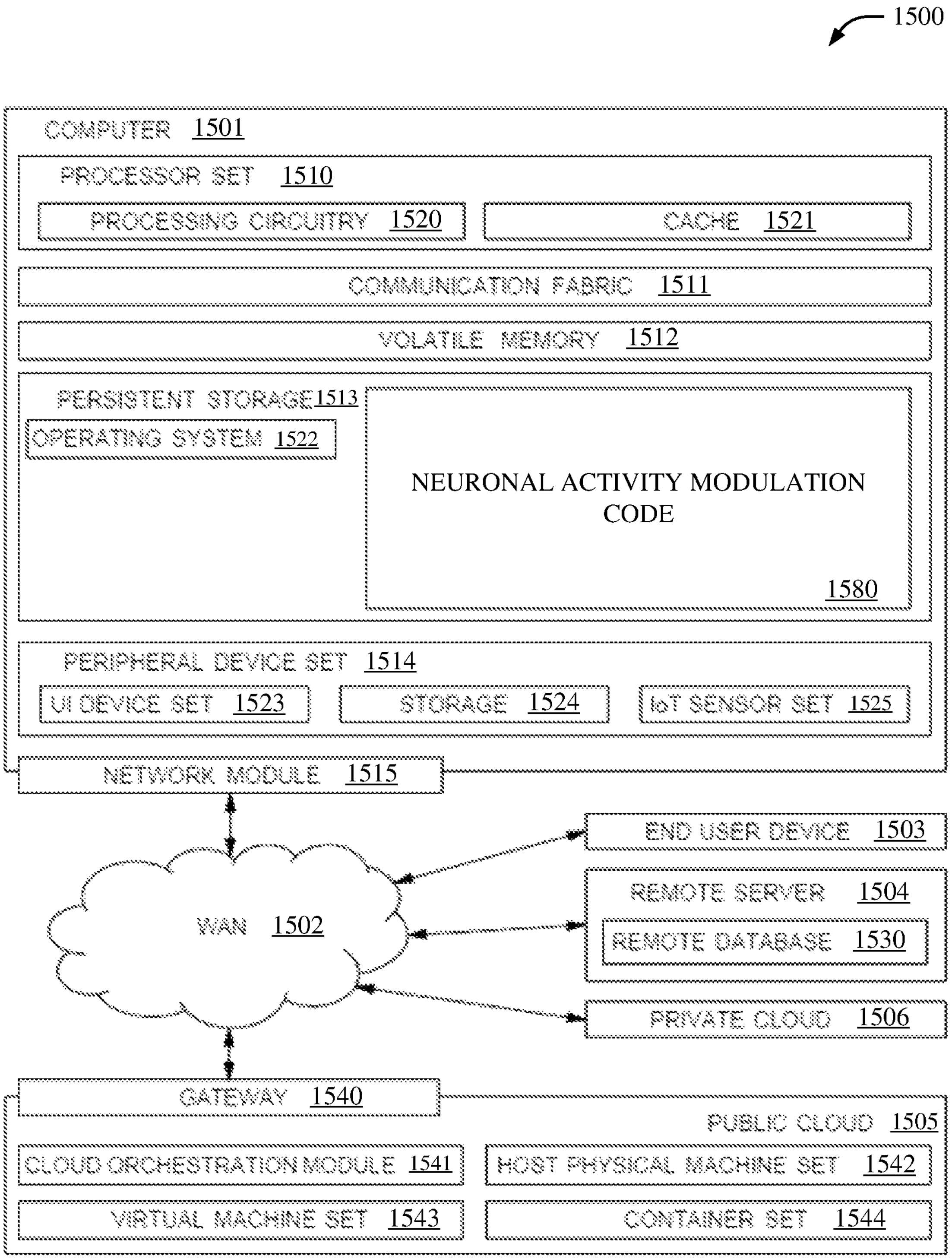
FIG. 15 illustrates a block diagram of an example, non-limiting operating environment in which one or more embodiments described herein can be facilitated.

FIG. 15 and the following discussion are intended to provide a brief, general description of a suitable computing environment 1500 in which one or more embodiments described herein can be implemented. For example, various aspects of the present disclosure are described by narrative text, flowcharts, block diagrams of computer systems or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks can be performed in reverse order, as a single integrated step, concurrently or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions or data for performing computer operations specified in a given CPP claim. A "storage device" is any tangible device that can retain and store instructions for use by a computer processor. Without limitation, the computer readable storage medium can be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include diskette, hard disk, random access memory (RAM), read-only memory (ROM), erasable programmable read-only memory (EPROM or Flash memory), static random-access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 1500 contains an example of an environment for the execution of at least some of the computer code involved in performing the inventive methods, such as neuronal activity modulation code 1580. In addition to block 1580, computing environment 1500 includes, for example, computer 1501, wide area network (WAN) 1502, end user device (EUD) 1503, remote server 1504, public cloud 1505, and private cloud 1506. In this embodiment, computer 1501 includes processor set 1510 (including processing circuitry 1520 and cache 1521), communication fabric 1511, volatile memory 1512, persistent storage 1513 (including operating system 1522 and block 1580, as identified above), peripheral device set 1514 (including user interface (UI), device set 1523, storage 1524, and Internet of Things (IoT) sensor set 1525), and network module 1515. Remote server 1504 includes remote database 1530. Public cloud 1505 includes gateway 1540, cloud orchestration module 1541, host physical machine set 1542, virtual machine set 1543, and container set 1544.

COMPUTER 1501 can take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 1530. As is well understood in the art of computer technology, and depending upon the technology, performance of a computer-implemented method can be distributed among multiple computers or between multiple locations. On the other hand, in this presentation of computing environment 1500, detailed discussion is focused on a single computer, specifically computer 1501, to keep the presentation as simple as possible. Computer 1501 can be located in a cloud, even though it is not shown in a cloud in FIG. 15. On the other hand, computer 1501 is not required to be in a cloud except to any extent as can be affirmatively indicated.

PROCESSOR SET 1510 includes one, or more, computer processors of any type now known or to be developed in the future. Processing circuitry 1520 can be distributed over multiple packages, for example, multiple, coordinated integrated circuit chips. Processing circuitry 1520 can implement multiple processor threads or multiple processor cores. Cache 1521 is memory that is located in the processor chip package(s) and is typically used for data or code that should be available for rapid access by the threads or cores running on processor set 1510. Cache memories are typically organized into multiple levels depending upon relative proximity to the processing circuitry. Alternatively, some, or all, of the cache for the processor set can be located "off chip." In some computing environments, processor set 1510 can be designed for working with qubits and performing quantum computing.

Computer readable program instructions are typically loaded onto computer 1501 to cause a series of operational steps to be performed by processor set 1510 of computer 1501 and thereby effect a computer-implemented method, such that the instructions thus executed will instantiate the methods specified in flowcharts or narrative descriptions of computer-implemented methods included in this document (collectively referred to as "the inventive methods"). These computer readable program instructions are stored in various types of computer readable storage media, such as cache 1521 and the other storage media discussed below. The program instructions, and associated data, are accessed by processor set 1510 to control and direct performance of the inventive methods. In computing environment 1500, at least some of the instructions for performing the inventive methods can be stored in block 1580 in persistent storage 1513.

COMMUNICATION FABRIC 1511 is the signal conduction path that allows the various components of computer 1501 to communicate with each other. Typically, this fabric is made of switches and electrically conductive paths, such as the switches and electrically conductive paths that make up busses, bridges, physical input/output ports and the like. Other types of signal communication paths can be used, such as fiber optic communication paths or wireless communication paths.

VOLATILE MEMORY 1512 is any type of volatile memory now known or to be developed in the future. Examples include dynamic type random access memory (RAM) or static type RAM. Typically, the volatile memory is characterized by random access, but this is not required unless affirmatively indicated. In computer 1501, the volatile memory 1512 is located in a single package and is internal to computer 1501, but, alternatively or additionally, the volatile memory can be distributed over multiple packages or located externally with respect to computer 1501.

PERSISTENT STORAGE 1513 is any form of non-volatile storage for computers that is now known or to be developed in the future. The non-volatility of this storage means that the stored data is maintained regardless of whether power is being supplied to computer 1501 or directly to persistent storage 1513. Persistent storage 1513 can be a read only memory (ROM), but typically at least a portion of the persistent storage allows writing of data, deletion of data and re-writing of data. Some familiar forms of persistent storage include magnetic disks and solid-state storage devices. Operating system 1522 can take several forms, such as various known proprietary operating systems or open-source Portable Operating System Interface type operating systems that employ a kernel. The code included in block 1580 typically includes at least some of the computer code involved in performing the inventive methods.

PERIPHERAL DEVICE SET 1514 includes the set of peripheral devices of computer 1501. Data communication connections between the peripheral devices and the other components of computer 1501 can be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 1523 can include components such as a display screen, speaker, microphone, wearable devices (such as goggles and smart watches), keyboard, mouse, printer, touchpad, game controllers, and haptic devices. Storage 1524 is external storage, such as an external hard drive, or insertable storage, such as an SD card. Storage 1524 can be persistent or volatile. In some embodiments, storage 1524 can take the form of a quantum computing storage device for storing data in the form of qubits. In embodiments where computer 1501 is required to have a large amount of storage (for example, where computer 1501 locally stores and manages a large database) then this storage can be provided by peripheral storage devices designed for storing large amounts of data, such as a storage area network (SAN) that is shared by multiple, geographically distributed computers. IoT sensor set 1525 is made up of sensors that can be used in Internet of Things applications. For example, one sensor can be a thermometer and another sensor can be a motion detector.

NETWORK MODULE 1515 is the collection of computer software, hardware, and firmware that allows computer 1501 to communicate with other computers through WAN 1502. Network module 1515 can include hardware, such as modems or Wi-Fi signal transceivers, software for packetizing or de-packetizing data for communication network transmission, or web browser software for communicating data over the internet. In some embodiments, network control functions and network forwarding functions of network module 1515 are performed on the same physical hardware device. In other embodiments (for example, embodiments that utilize software-defined networking (SDN)), the control functions and the forwarding functions of network module 1515 are performed on physically separate devices, such that the control functions manage several different network hardware devices. Computer readable program instructions for performing the inventive methods can typically be downloaded to computer 1501 from an external computer or external storage device through a network adapter card or network interface included in network module 1515.

WAN 1502 is any wide area network (for example, the internet) capable of communicating computer data over non-local distances by any technology for communicating computer data, now known or to be developed in the future. In some embodiments, the WAN can be replaced or supplemented by local area networks (LANs) designed to communicate data between devices located in a local area, such as a Wi-Fi network. The WAN or LANs typically include computer hardware such as copper transmission cables, optical transmission fibers, wireless transmission, routers, firewalls, switches, gateway computers and edge servers.

END USER DEVICE (EUD) 1503 is any computer system that is used and controlled by an end user (for example, a customer of an enterprise that operates computer 1501) and can take any of the forms discussed above in connection with computer 1501. EUD 1503 typically receives helpful and useful data from the operations of computer 1501. For example, in a hypothetical case where computer 1501 is designed to provide a recommendation to an end user, this recommendation would typically be communicated from network module 1515 of computer 1501 through WAN 1502 to EUD 1503. In this way, EUD 1503 can display, or otherwise present, the recommendation to an end user. In some embodiments, EUD 1503 can be a client device, such as thin client, heavy client, mainframe computer or desktop computer.

REMOTE SERVER 1504 is any computer system that serves at least some data or functionality to computer 1501. Remote server 1504 can be controlled and used by the same entity that operates computer 1501. Remote server 1504 represents the machine(s) that collect and store helpful and useful data for use by other computers, such as computer 1501. For example, in a hypothetical case where computer 1501 is designed and programmed to provide a recommendation based on historical data, then this historical data can be provided to computer 1501 from remote database 1530 of remote server 1504.

PUBLIC CLOUD 1505 is any computer system available for use by multiple entities that provides on-demand availability of computer system resources or other computer capabilities, especially data storage (cloud storage) and computing power, without direct active management by the scale. The direct and active management of the computing resources of public cloud 1505 is performed by the computer hardware or software of cloud orchestration module 1541. The computing resources provided by public cloud 1505 are typically implemented by virtual computing environments that run on various computers making up the computers of host physical machine set 1542, which is the universe of physical computers in or available to public cloud 1505. The virtual computing environments (VCEs) typically take the form of virtual machines from virtual machine set 1543 or containers from container set 1544. It is understood that these VCEs can be stored as images and can be transferred among and between the various physical machine hosts, either as images or after instantiation of the VCE. Cloud orchestration module 1541 manages the transfer and storage of images, deploys new instantiations of VCEs and manages active instantiations of VCE deployments. Gateway 1540 is the collection of computer software, hardware and firmware allowing public cloud 1505 to communicate through WAN 1502.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 1506 is similar to public cloud 1505, except that the computing resources are only available for use by a single enterprise. While private cloud 1506 is depicted as being in communication with WAN 1502, in other embodiments a private cloud can be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, or data/application portability between the multiple constituent clouds. In this embodiment, public cloud 1505 and private cloud 1506 are both part of a larger hybrid cloud.

The embodiments described herein can be directed to one or more of a system, a method, an apparatus or a computer program product at any possible technical detail level of integration. The computer program product can include a computer readable storage medium (or media) having computer readable program instructions thereon for causing a processor to carry out aspects of the one or more embodiments described herein. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a superconducting storage device or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon or any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network or a wireless network. The network can comprise copper transmission cables, optical transmission fibers, wireless transmission, routers, firewalls, switches, gateway computers or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the one or more embodiments described herein can be assembler instructions, instruction-set-architecture (ISA) instructions, machine instructions, machine dependent instructions, microcode, firmware instructions, state-setting data, configuration data for integrated circuitry, or source code or object code written in any combination of one or more programming languages, including an object oriented programming language such as Smalltalk, C++ or the like, or procedural programming languages, such as the "C" programming language or similar programming languages. The computer readable program instructions can execute entirely on a computer, partly on a computer, as a stand-alone software package, partly on a computer or partly on a remote computer or entirely on the remote computer or server. In the latter scenario, the remote computer can be connected to a computer through any type of network, including a local area network (LAN) or a wide area network (WAN), or the connection can be made to an external computer (for example, through the Internet using an Internet Service Provider). In one or more embodiments, electronic circuitry including, for example, programmable logic circuitry, field-programmable gate arrays (FPGA) or programmable logic arrays (PLA) can execute the computer readable program instructions by utilizing state information of the computer readable program instructions to personalize the electronic circuitry, in order to perform aspects of the one or more embodiments described herein.

Aspects of the one or more embodiments described herein are described with reference to flowchart illustrations or block diagrams of methods, apparatus (systems), and computer program products according to one or more embodiments described herein. It will be understood that each block of the flowchart illustrations or block diagrams, and combinations of blocks in the flowchart illustrations or block diagrams, can be implemented by computer readable program instructions. These computer readable program instructions can be provided to a processor of a general-purpose computer, special purpose computer or other programmable data processing apparatus to produce a machine, such that the instructions, which execute via the processor of the computer or other programmable data processing apparatus, can create means for implementing the functions/acts specified in the flowchart or block diagram block or blocks. These computer readable program instructions can also be stored in a computer readable storage medium that can direct a computer, a programmable data processing apparatus or other devices to function in a particular manner, such that the computer readable storage medium having instructions stored therein can comprise an article of manufacture including instructions which can implement aspects of the function/act specified in the flowchart or block diagram block or blocks. The computer readable program instructions can also be loaded onto a computer, other programmable data processing apparatus or other device to cause a series of operational acts to be performed on the computer, other programmable apparatus or other device to produce a computer implemented process, such that the instructions which execute on the computer, other programmable apparatus or other device implement the functions/acts specified in the flowchart or block diagram block or blocks.

The flowcharts and block diagrams in the figures illustrate the architecture, functionality or operation of possible implementations of systems, computer-implementable methods or computer program products according to one or more embodiments described herein. In this regard, each block in the flowchart or block diagrams can represent a module, segment or portion of instructions, which comprises one or more executable instructions for implementing the specified logical function. In one or more alternative implementations, the functions noted in the blocks can occur out of the order noted in the Figures. For example, two blocks shown in succession can be executed substantially concurrently, or the blocks can sometimes be executed in the reverse order, depending upon the functionality involved. It will also be noted that each block of the block diagrams or flowchart illustration, or combinations of blocks in the block diagrams or flowchart illustration, can be implemented by special purpose hardware-based systems that can perform the specified functions or acts or carry out one or more combinations of special purpose hardware or computer instructions.

While the subject matter has been described above in the general context of computer-executable instructions of a computer program product that runs on a computer or computers, those skilled in the art will recognize that the one or more embodiments herein also can be implemented at least partially in parallel with one or more other program modules. Generally, program modules include routines, programs, components or data structures that perform particular tasks or implement particular abstract data types. Moreover, the aforedescribed computer-implemented methods can be practiced with other computer system configurations, including single-processor or multiprocessor computer systems, mini-computing devices, mainframe computers, as well as computers, hand-held computing devices (e.g., PDA, phone), or microprocessor-based or programmable consumer or industrial electronics. The illustrated aspects can also be practiced in distributed computing environments in which tasks are performed by remote processing devices that are linked through a communications network. However, one or more, if not all aspects of the one or more embodiments described herein can be practiced on stand-alone computers. In a distributed computing environment, program modules can be located in both local and remote memory storage devices.

As used in this application, the terms “component,” “system,” “platform” or “interface” can refer to or can include a computer-related entity or an entity related to an operational machine with one or more specific functionalities. The entities described herein can be either hardware, a combination of hardware and software, software, or software in execution. For example, a component can be, but is not limited to being, a process running on a processor, a processor, an object, an executable, a thread of execution, a program or a computer. By way of illustration, both an application running on a server and the server can be a component. One or more components can reside within a process or thread of execution and a component can be localized on one computer or distributed between two or more computers. In another example, respective components can execute from various computer readable media having various data structures stored thereon. The components can communicate via local or remote processes such as in accordance with a signal having one or more data packets (e.g., data from one component interacting with another component in a local system, distributed system or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, where the electronic components can include a processor or other means to execute software or firmware that confers at least in part the functionality of the electronic components. In an aspect, a component can emulate an electronic component via a virtual machine, e.g., within a cloud computing system.

In addition, the term “or” is intended to mean an inclusive “or” rather than an exclusive “or.” That is, unless specified otherwise, or clear from context, “X employs A or B” is intended to mean any of the natural inclusive permutations. That is, if X employs A; X employs B; or X employs both A and B, then “X employs A or B” is satisfied under any of the foregoing instances. As used herein, the term “and/or” is intended to have the same meaning as “or.” Moreover, articles “a” and “an” as used in the subject specification and annexed drawings should generally be construed to mean “one or more” unless specified otherwise or clear from context to be directed to a singular form. As used herein, the terms “example” or “exemplary” are utilized to mean serving as an example, instance, or illustration. For the avoidance of doubt, the subject matter described herein is not limited by such examples. In addition, any aspect or design described herein as an “example” or “exemplary” is not necessarily to be construed as preferred or advantageous over other aspects or designs, nor is it meant to preclude equivalent exemplary structures and techniques known to those of ordinary skill in the art.

The herein disclosure describes non-limiting examples of various embodiments. For ease of description or explanation, various portions of the herein disclosure utilize the term “each”, “every”, or “all” when discussing various embodiments. Such usages of the term “each”, “every”, or “all” are non-limiting examples. In other words, when the herein disclosure provides a description that is applied to “each”, “every”, or “all” of some particular object or component, it should be understood that this is a non-limiting example of various embodiments, and it should be further understood that, in various other embodiments, it can be the case that such description applies to fewer than “each”, “every”, or “all” of that particular object or component.

As it is employed in the subject specification, the term “processor” can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; or parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches or gates, in order to optimize space usage or to enhance performance of related equipment. A processor can be implemented as a combination of computing processing units.

Herein, terms such as “store,” “storage,” “data store,” data storage,” “database,” and substantially any other information storage component relevant to operation and functionality of a component are utilized to refer to “memory components,” entities embodied in a “memory,” or components comprising a memory. Memory or memory components described herein can be either volatile memory or nonvolatile memory or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory or nonvolatile random-access memory (RAM) (e.g., ferroelectric RAM (FeRAM). Volatile memory can include RAM, which can act as external cache memory, for example. By way of illustration and not limitation, RAM can be available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM) or Rambus dynamic RAM (RDRAM). Also, the described memory components of systems or computer-implemented methods herein are intended to include, without being limited to including, these or any other suitable types of memory.

What has been described above includes mere examples of systems and computer-implemented methods. It is, of course, not possible to describe every conceivable combination of components or computer-implemented methods for purposes of describing the one or more embodiments, but one of ordinary skill in the art can recognize that many further combinations or permutations of the one or more embodiments are possible. Furthermore, to the extent that the terms "includes," "has," "possesses," and the like are used in the detailed description, claims, appendices or drawings such terms are intended to be inclusive in a manner similar to the term "comprising" as "comprising" is interpreted when employed as a transitional word in a claim.

The descriptions of the various embodiments have been presented for purposes of illustration but are not intended to be exhaustive or limited to the embodiments described herein. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A system, comprising:

a processor, a computer-readable memory, and an artificial neural network stored in the computer-readable memory and executable by the processor, wherein the artificial neural network comprises:

a set of base neuron populations that collectively generate, during an inferencing phase or a training phase of the artificial neural network, an inferencing task result based on a data candidate, wherein each base neuron population of the set of base neuron populations is a distinct layer of layers of the artificial neural network, and wherein each base neuron population generates internal operands based on inputs, and generates outputs based on the internal operands; and a control neuron population that is independent of the set of base neuron populations, wherein the control neuron population refrains from supplying outputs as the inputs to the set of base neuron populations used to generate the internal operands, and wherein the control neuron population compute in real-time modulatory signals that modulate, during the inferencing phase or the training phase, neuronal activity of at least one base neuron population of the set of base neuron populations by scaling one or more of the internal operands generated by the at least one base neuron population.

2. The system of claim 1, wherein the at least one base neuron population receives the inputs from outputs produced by one or more of the set of base neuron populations, and wherein the control neuron population receives at least a portion of the outputs produced by one or more of the set of base neuron populations.

3. The system of claim 1, wherein the control neuron population receives, via bottom-up skip connections, inputs produced by one or more of the set of base neuron populations that are prior to the at least one base neuron population in the artificial neural network.

4. The system of claim 1, wherein the control neuron population receives, via top-down skip connections, inputs produced by one or more of the set of base neuron populations that are subsequent to the at least one base neuron population in the artificial neural network.

5. The system of claim 1, wherein the at least one base neuron population and the control neuron population exhibit non-uniform types of neuronal dynamics.

6. The system of claim 5, wherein the non-uniform types of neuronal dynamics are selected from a group consisting of perceptron dynamics, spiking neural unit dynamics, long short-term memory dynamics, gated recurrent unit dynamics, and quasi recurrent unit dynamics.

7. The system of claim 1, wherein the control neuron population is enabled to selectively produce modulatory signals that modulate, during the inferencing phase or the training phase, neuronal activity of each base neuron population of the set of base neuron populations.

8. A computer-implemented method, comprising:

generating, by a set of base neuron populations of an artificial neural network and during an inferencing phase or a training phase of the artificial neural network, an inferencing task result based on a data candidate, wherein each base neuron population of the set of base neuron populations is a distinct layer of layers of the artificial neural network, and wherein each base neuron population generates internal operands based on inputs, and generates outputs based on the internal operands; and modulating, by a control neuron population that is independent of the set of base neuron populations and during the inferencing phase or the training phase, neuronal activity of at least one base neuron population of the set of base neuron populations by scaling one or more of the internal operands generated by the at least one base neuron population, wherein the control neuron population refrains from supplying outputs as the inputs to the set of base neuron populations used to generate the internal operands.

9. The computer-implemented method of claim 8, wherein the at least one base neuron population receives the inputs from outputs produced by one or more of the set of base neuron populations, and wherein the control neuron population receives at least a portion of the outputs produced by one or more of the set of base neuron populations.

10. The computer-implemented method of claim 8, wherein the control neuron population receives, via bottom-up skip connections, inputs produced by one or more of the set of base neuron populations that are prior to the at least one base neuron population in the artificial neural network.

11. The computer-implemented method of claim 8, wherein the control neuron population receives, via top-down skip connections, inputs produced by one or more of the set of base neuron populations that are subsequent to the at least one base neuron population in the artificial neural network.

12. The computer-implemented method of claim 8, wherein the at least one base neuron population and the control neuron population exhibit non-uniform types of neuronal dynamics.

13. The computer-implemented method of claim 12, wherein the non-uniform types of neuronal dynamics are selected from a group consisting of perceptron dynamics, spiking neural unit dynamics, long short-term memory dynamics, gated recurrent unit dynamics, and quasi recurrent unit dynamics.

14. The computer-implemented method of claim 8, wherein the control neuron population is enabled to selectively produce modulatory signals that modulate, during the inferencing phase or the training phase, neuronal activity of each base neuron population of the set of base neuron populations.

15. A computer program product for facilitating neuronal activity modulation of artificial neural networks, the computer program product comprising a computer-readable memory having program instructions embodied therewith, the program instructions executable by a processor to cause the processor to:

generate, by a set of base neuron populations of an artificial neural network and during an inferencing phase or a training phase of the artificial neural network, an inferencing task result based on a data candidate, wherein each base neuron population of the set of base neuron populations is a distinct layer of layers of the artificial neural network, and wherein each base neuron population generates internal operands based on inputs, and generates outputs based on the internal operands; and modulate, by a control neuron population that is independent of the set of base neuron populations and during the inferencing phase or the training phase, neuronal activity of at least one base neuron population of the set of base neuron populations by scaling one or more of the internal operands generated by the at least one base neuron population, wherein the control neuron population refrains from supplying outputs as the inputs to the set of base neuron populations used to generate the internal operands.

16. The computer program product of claim 15, wherein the at least one base neuron population receives the inputs from outputs produced by one or more of the set of base neuron populations, and wherein the control neuron population receives at least a portion of the outputs produced by one or more of the set of base neuron populations.

17. The computer program product of claim 15, wherein the control neuron population receives, via bottom-up skip connections, inputs produced by one or more of the set of base neuron populations that are prior to the at least one base neuron population in the artificial neural network.

18. The computer program product of claim 15, wherein the control neuron population receives, via top-down skip connections, inputs produced by one or more of the set of base neuron populations that are subsequent to the at least one base neuron population in the artificial neural network.

19. The computer program product of claim 15, wherein the at least one base neuron population and the control neuron population exhibit non-uniform types of neuronal dynamics.

20. The computer program product of claim 19, wherein the non-uniform types of neuronal dynamics are selected from a group consisting of perceptron dynamics, spiking neural unit dynamics, long short-term memory dynamics, gated recurrent unit dynamics, and quasi recurrent unit dynamics.

* * * * *